United States Patent
Roorda et al.

(10) Patent No.: US 9,160,478 B2
(45) Date of Patent: Oct. 13, 2015

(54) RECONFIGURABLE OPTICAL ADD/DROP MULTIPLEXOR AND OPTICAL SWITCHING NODE

(71) Applicant: JDS Uniphase Corporation, Milpitas, CA (US)

(72) Inventors: Peter David Roorda, Ottawa (CA); Sheldon McLaughlin, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 14/173,912

(22) Filed: Feb. 6, 2014

(65) Prior Publication Data
US 2014/0255026 A1    Sep. 11, 2014

Related U.S. Application Data

(60) Provisional application No. 61/772,787, filed on Mar. 5, 2013.

(51) Int. Cl.
*H04J 14/02* (2006.01)
*H04Q 11/00* (2006.01)

(52) U.S. Cl.
CPC ........ *H04J 14/0212* (2013.01); *H04Q 11/0005* (2013.01)

(58) Field of Classification Search
CPC . H04J 14/021; H04J 14/0212; H04J 14/0201; H04J 14/0204; H04J 14/0205; H04J 14/0202; H04J 14/0206; H04J 14/0209
USPC ........... 398/83, 79, 82, 84, 85, 45, 46, 48, 49, 398/50, 51; 385/24, 37, 16, 17, 18, 31, 14
See application file for complete search history.

(56) References Cited

U.S. PATENT DOCUMENTS

| | | | |
|---|---|---|---|
| 7,106,966 B1 | 9/2006 | Lalonde et al. | 398/46 |
| 8,045,854 B2 | 10/2011 | Colbourne | 398/48 |
| 8,111,995 B2 | 2/2012 | Wisseman | 398/83 |
| 8,116,630 B2 | 2/2012 | Wisseman | 398/83 |
| 8,233,794 B2 | 7/2012 | Colbourne et al. | 398/48 |
| 8,300,995 B2 | 10/2012 | Colbourne | 385/17 |
| 2004/0258411 A1 | 12/2004 | Al-Salameh et al. | 398/83 |
| 2009/0041457 A1* | 2/2009 | Maki et al. | 398/45 |
| 2009/0232497 A1* | 9/2009 | Archambault et al. | 398/50 |
| 2012/0027408 A1 | 2/2012 | Atlas et al. | 398/58 |
| 2012/0170930 A1* | 7/2012 | Komiya | 398/34 |
| 2012/0219293 A1* | 8/2012 | Boertjes et al. | 398/48 |

OTHER PUBLICATIONS

"Digital Coherent Receiver Technology for 100-Gb/s Optical Transport Systems" Rasmussen et al. Fujitsu Sci. Tech. J., vol. 46, No. 1, pp. 63-71 Jan. 2010.

* cited by examiner

*Primary Examiner* — Hanh Phan
(74) *Attorney, Agent, or Firm* — Matthew A. Pequignot; Pequignot + Myers LLC

(57) ABSTRACT

A colorless, directionless ROADM includes a pair of contentioned add and drop wavelength-selective optical switches, an input wavelength-selective optical switch having one input port, and an output wavelength-selective optical switch having one output port. Unintended input-to-output port couplings, which appear in the "contentioned" add and drop switches, can be mitigated by the input and output wavelength-selective optical switches carrying the through traffic.

17 Claims, 14 Drawing Sheets

RECONFIGURABLE OPTICAL ADD/DROP MULTIPLEXOR AND OPTICAL SWITCHING NODE

CROSS-REFERENCE TO RELATED APPLICATIONS

The present invention claims priority from U.S. Patent Application No. 61/772,787 filed Mar. 5, 2013, which is incorporated herein by reference.

TECHNICAL FIELD

The present invention relates to optical networking, and in particular to optical switching equipment and methods.

BACKGROUND OF THE INVENTION

In a wavelength division multiplexed (WDM) optical network, optical signals at a plurality of wavelengths are encoded with digital streams of information. These encoded optical signals, or "wavelength channels", are combined and transmitted through a series of spans of optical fiber. At a receiver end, the wavelength channels are separated and detected by optical receivers.

In a reconfigurable WDM optical network, wavelength channels can be added or dropped at nodes of the network, using so-called reconfigurable optical add/drop multiplexors, or ROADMs. Nowadays, adding and dropping of wavelength channels can be done dynamically, in response to fluctuating data bandwidth requirements between various network nodes. From the network architecture standpoint, it is preferable that the ROADMs capability to dynamically add or drop wavelength channels be independent on wavelength channels presently used. This feature, called "colorless" add/drop capability of a ROADM, is highly desirable. It is further preferable that a ROADM can add and drop wavelength channels arriving from or going to a plurality of directions, without any limitations or contentions. This last feature of a ROADM is called "directionless".

ROADMs allow flexible and wavelength-selective all-optical routing of wavelength channels at fiber optic network nodes. Colorless-directionless ROADMs further allow locally terminated channels to be tuned to different wavelengths and optically routed to a desired outbound direction in an automated fashion.

A conventional colorless-directionless ROADM 100 is illustrated in FIG. 1. The ROADM 100 includes three inbound wavelength-selective switches (WSS) 101, 102, and 103, for receiving inbound WDM optical signals 111 from West, North, and East directions, respectively; three outbound WSS 104, 105, and 106, for sending outbound WDM optical signals 112 to West, North, and East directions, respectively; and local add 113 and drop 114 switch sections for adding and dropping "local" wavelength channels, respectively. A WSS is an optical switch that can independently switch individual wavelength channels from any of its input port(s) to any of its output port(s).

Each of the add 113 and drop 114 switch sections include two pairs of WSS. Although one pair can be used, two pairs are preferable for redundancy purposes. In the add path, each pair includes a M×1 WSS 115 coupled to an 1×N WSS 116, for independent switching of any locally generated M wavelength channel to propagate in any of the West, North, and East outbound directions. In the drop path, each pair includes a N×1 WSS 117 coupled to an 1×M WSS 118, for independent switching of any wavelength channel arriving from the West, North, and East inbound directions to be detected by local optical receivers, not shown.

In operation, the M×1 WSS 115 select and combine wavelength channels to be added, and the 1×N WSS 116 route the selected wavelength channels to the desired outbound directions West, North, and East, via the corresponding WSS 104, 105, and 106. The ROADM 100 has a total of fourteen WSS, which results in a high device cost and a high optical losses. One could in principle replace the M×1 WSS 115 with optical combiners and 1×N WSS 116 with optical splitters, but that would increase optical losses even further, especially for high M, N port count, as well as potentially increase optical crosstalk.

Referring to FIG. 2 with further reference to FIG. 1, a prior-art ROADM 200 of FIG. 2 is similar to the prior-art ROADM 100 of FIG. 1. Inbound West (W) WSS 201, North (N) WSS 202, and East (E) WSS 203 correspond to the inbound WSS 101, 102, and 103 of the ROADM 100 of FIG. 1, respectively; and outbound West (W) WSS 204, North (N) WSS 205, and East (E) WSS 206 correspond to the outbound WSS 104, 105, and 106 of the ROADM 100 of FIG. 1, respectively. Optical splitters can be used in place of the inbound WSS 201 to 203, albeit at a cost of an increased insertion loss and/or crosstalk.

One difference of the ROADM 200 of FIG. 2 is that a pair of M×N WSS 215 and a pair of N×M WSS 216 are used in local add 213 and drop 214 switch sections, respectively. The M×N WSS 215 (FIG. 2) are used each in place of the M×1 WSS 115 coupled to the 1×N WSS 116 (FIG. 1); and the N×M WSS 216 (FIG. 2) are used each in place of the N×1 WSS 117 coupled to the 1×M WSS 118 (FIG. 1), for local add/drop colorless and directionless switching.

A drawback of the ROADM 200 of FIG. 2, limiting its practical use, is that presently available implementations for the M×N WSS 215 or N×M WSS 216 (the two have a same construction, because WSS are bidirectional devices) are quite complex and costly. Most suggested implementations for the M×N WSS 215 or N×M WSS 216 require multiple stages of switching and/or complex two-dimensional arrays of switching elements. By way of example, Colbourne in U.S. Pat. Nos. 8,045,854 and 8,300,995; Lalonde et al. in U.S. Pat. No. 7,106,966; Colbourne et al. in U.S. Pat. No. 8,233,794; Wisseman in U.S. Pat. No. 8,111,995; and Atlas et al. in US Patent Application Publication 2012/0027408, disclose such M×N wavelength-selective optical switches.

SUMMARY OF THE INVENTION

The inventors have realized that full M×N wavelength-selective switching capability afforded by full M×N WSS or M×1-1×N WSS pair coupled back-to-back, although generally desirable, is not in fact required in colorless, directionless ROADM configurations. According to the invention, a colorless, directionless ROADM can be built using an 1×N WSS modified by merely increasing number of its input ports from 1 to M, without having to make significant changes to the rest of the WSS construction, making the construction considerably simpler than a prior-art contentionless M×N WSS. Resulting unintended input-to-output port couplings, which appear in the "contentioned" M×N WSS of the invention, can in fact be mitigated by the input and output WSS of the ROADM, carrying the through traffic. The "contentioned" M×N WSS can be constructed using a micro-electro-mechanical system (MEMS) or a liquid crystal-on-silicon (LCoS) array. LCoS arrays allow switching continuous wavelength bands of varying widths, and/or splitting the incoming optical beams to simultaneously propagate to more than one output port.

In accordance with the invention, there is provided a ROADM comprising:

at least one input wavelength-selective switch (WSS) having an input port for inputting a plurality of input wavelength channels, and a plurality of intermediate ports, wherein the input WSS is configured for independently redirecting the input wavelength channels to the intermediate ports for output as through or DROP wavelength channels;

at least one ADD switch, each comprising:

a plurality of ingress ports for launching ADD wavelength channels, a plurality of egress ports for outputting the ADD wavelength channels, a first array of directors for redirecting the ADD wavelength channels impinging thereon to a selected egress port, and a first wavelength-selective coupler for coupling the ingress ports to the array of directors, and the array of directors to the egress ports, at least one DROP switch, each comprising:

a plurality of ingress ports, one of which coupled to one of the intermediate ports of the input WSS for receiving the DROP wavelength channels, a plurality of egress ports for outputting the DROP wavelength channels, a second array of directors for redirecting the DROP wavelength channels impinging thereon to a selected one of the egress ports, and a second wavelength-selective coupler for coupling the ingress ports to the second array of directors, and the second array of directors to the egress ports, wherein each director of the first and second arrays corresponds to a unique center wavelength, and each director is disposed with respect to the respective wavelength-selective coupler for receiving any wavelength channel at the corresponding center wavelength at a single location from any one of the ingress ports, wherein each director has a plurality of independently controllable states, wherein each of the states defines a single coupling relationship between the ingress ports and the egress ports, whereby different wavelength channels are independently switchable by different directors of the array between the ingress and the egress ports; and at least one output WSS having a plurality of entrance ports, each of the entrance ports coupled to a respective one of the intermediate ports of each input WSS or a respective one of the egress ports of each ADD switch for inputting the through and ADD wavelength channels to be combined into an output WDM signal, and an exit port for outputting the output WDM signal.

In accordance with the invention, there is further provided a wavelength-selective switch comprising a plurality of ingress ports, a plurality of egress ports, a LCoS array for redirecting wavelength channels impinging thereon, and a wavelength-selective coupler for coupling the ingress ports to the LCoS array, and the LCoS array to the egress ports, wherein the LCoS array comprises a plurality of directors each comprising a plurality of pixels, wherein each director corresponds to a unique center wavelength, and each director is disposed with respect to the wavelength-selective coupler for receiving any wavelength channel at the corresponding center wavelength at a single location from any one of the ingress ports, for imparting a phase retardation profile to an impinging wavelength channel, thereby redirecting the impinging wavelength channel;

wherein each director of the array has a plurality of independently controllable states, wherein each of the states defines a single coupling relationship between the ingress ports and the egress ports, whereby different wavelength channels are independently switchable by the directors of the array between the ingress and the egress ports.

In accordance with the invention, there is further provided an optical switching node comprising two of the above ROADMs, and wherein one of the ingress ports of the DROP switch of a first one of the two ROADMs is coupled to one of the intermediate ports of a second one of the two ROADMs, and one of the egress ports of the ADD switch of the first ROADM is coupled to one of the entrance ports of the second ROADM.

In accordance with another aspect of the invention, there is further provided a method of controlling the above ROADM, the method comprising:

(a) building a first look-up table of DROP wavelength channels directed from the input port to the DROP switch, wherein each DROP wavelength channel of the first look-up table has a center wavelength that is different from a center wavelength of every other channel in the first look-up table;

(b) upon completion of step (a), receiving a command to drop a first wavelength channel;

(c) upon completion of step (b), determining that a center wavelength of the first wavelength channel is different from a center wavelength of every DROP wavelength channel in the first look-up table;

(d) upon completion of step (c), controlling the input WSS to direct the first wavelength channel to the DROP switch; and (e) upon completion of step (c), adding the first wavelength channel to the first look-up table.

In accordance with another aspect of the invention, there is further provided a method of controlling the above described optical switching node, the method comprising:

(A) building a third look-up table of DROP wavelength channels directed from the input ports of the first and second ROADMs to the DROP switch of the first ROADM, wherein each DROP wavelength channel of the third look-up table has a center wavelength that is different from a center wavelength of every other channel in the third look-up table;

(B) building a fourth look-up table of DROP wavelength channels directed from the input ports of the first and second ROADMs to the DROP switch of the second ROADM, wherein each DROP wavelength channel of the fourth look-up table has a center wavelength that is different from a center wavelength of every other DROP wavelength channel in the fourth look-up table;

(C) upon completion of steps (A) and (B), receiving a command to drop a third wavelength channel to the DROP switch of the first ROADM, and a fourth wavelength channel to the DROP switch of the second ROADM;

(D) upon completion of step (C), determining that a center wavelength of the third and fourth wavelength channels is different from a center wavelength of every DROP wavelength channel in the third and fourth look-up tables, respectively;

(E) upon completion of step (D), controlling the input WSS of the first and second ROADM to direct the third and fourth wavelength channels to the DROP switch of the first and second ROADM, respectively; and (F) upon completion of step (D), adding the third and fourth wavelength channels to the third and fourth look-up tables, respectively.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
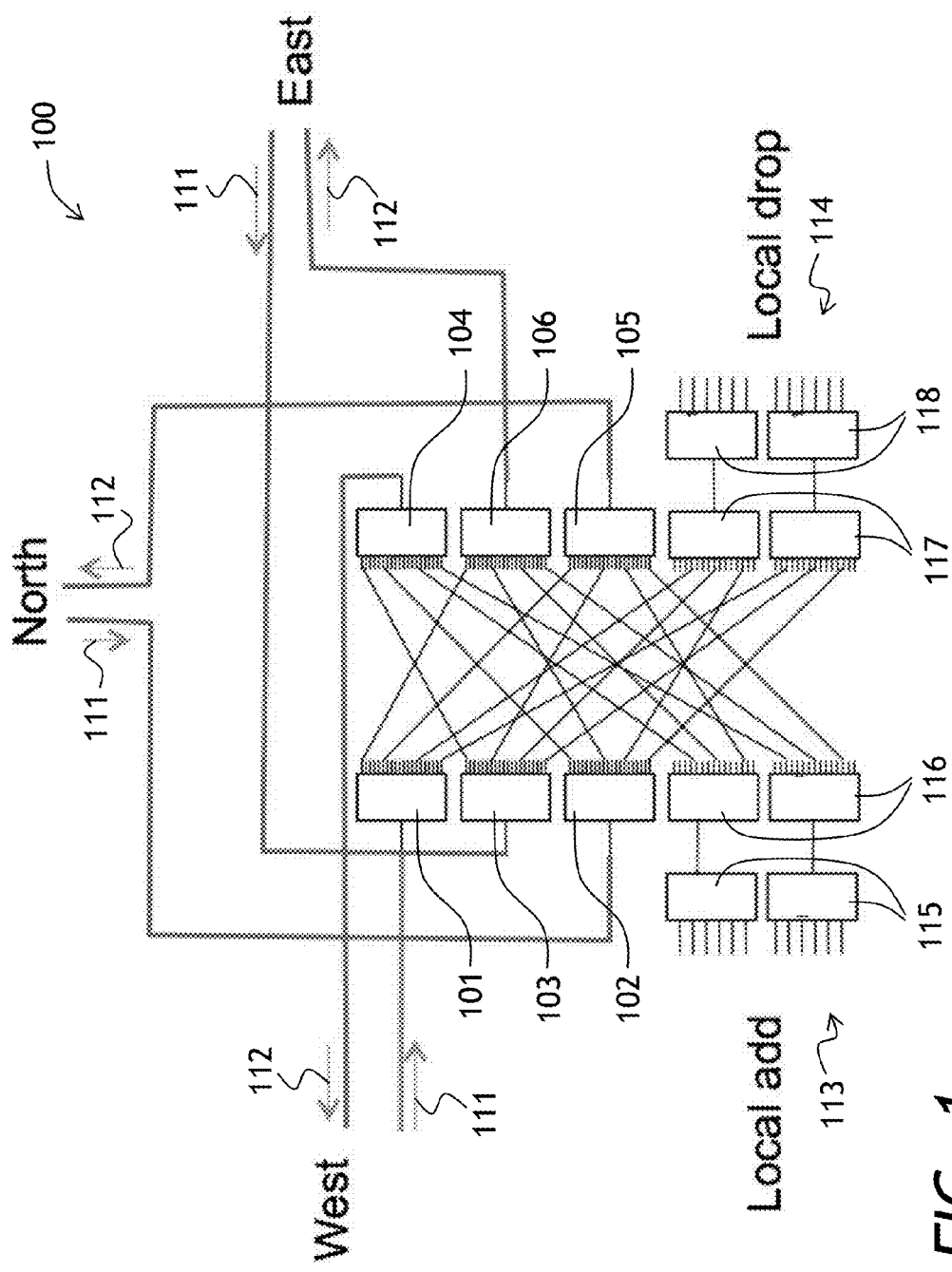
FIGS. 1 and 2 are block diagrams of prior-art colorless, directionless ROADMs.
Figure 2:
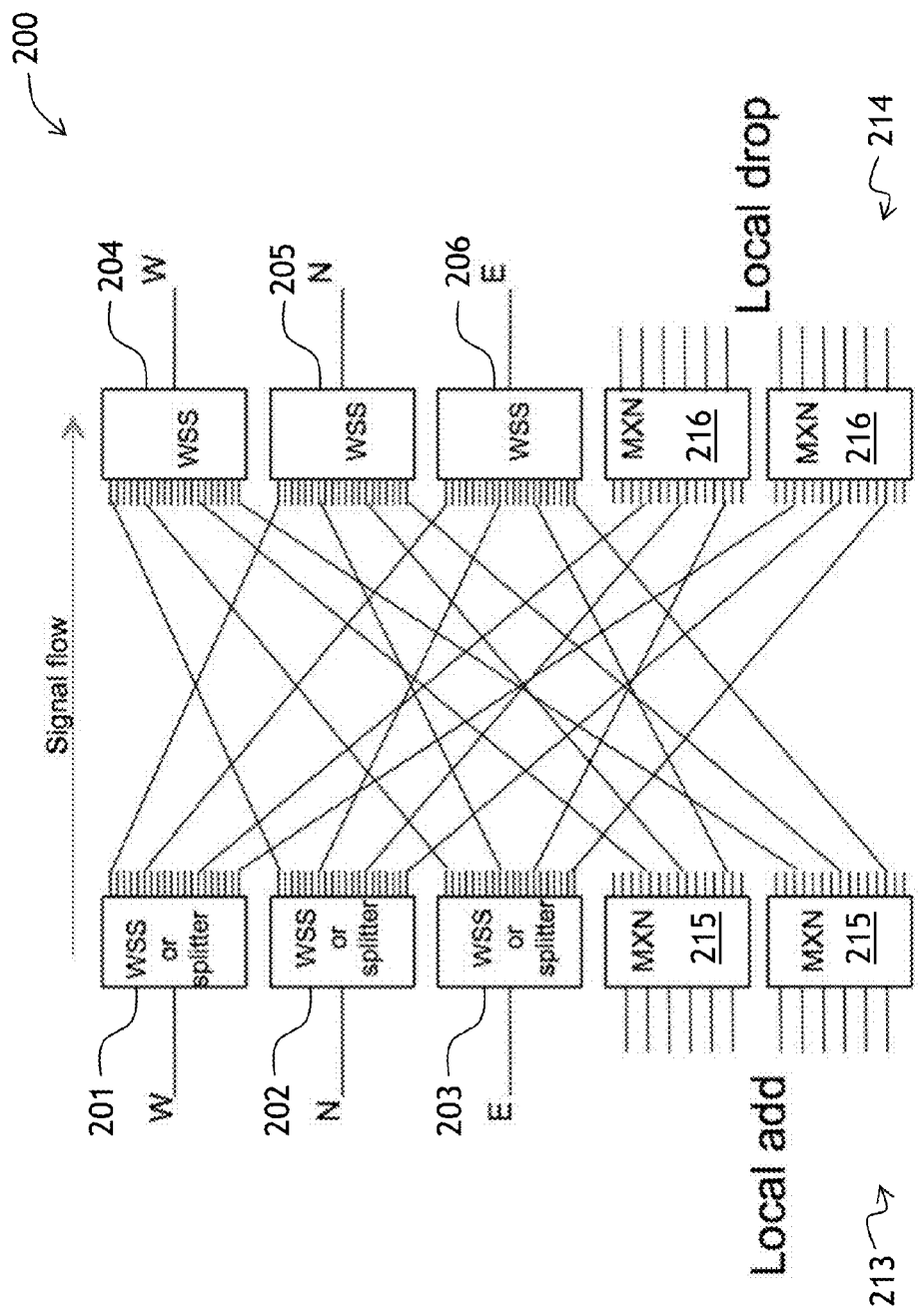
Figure 3:
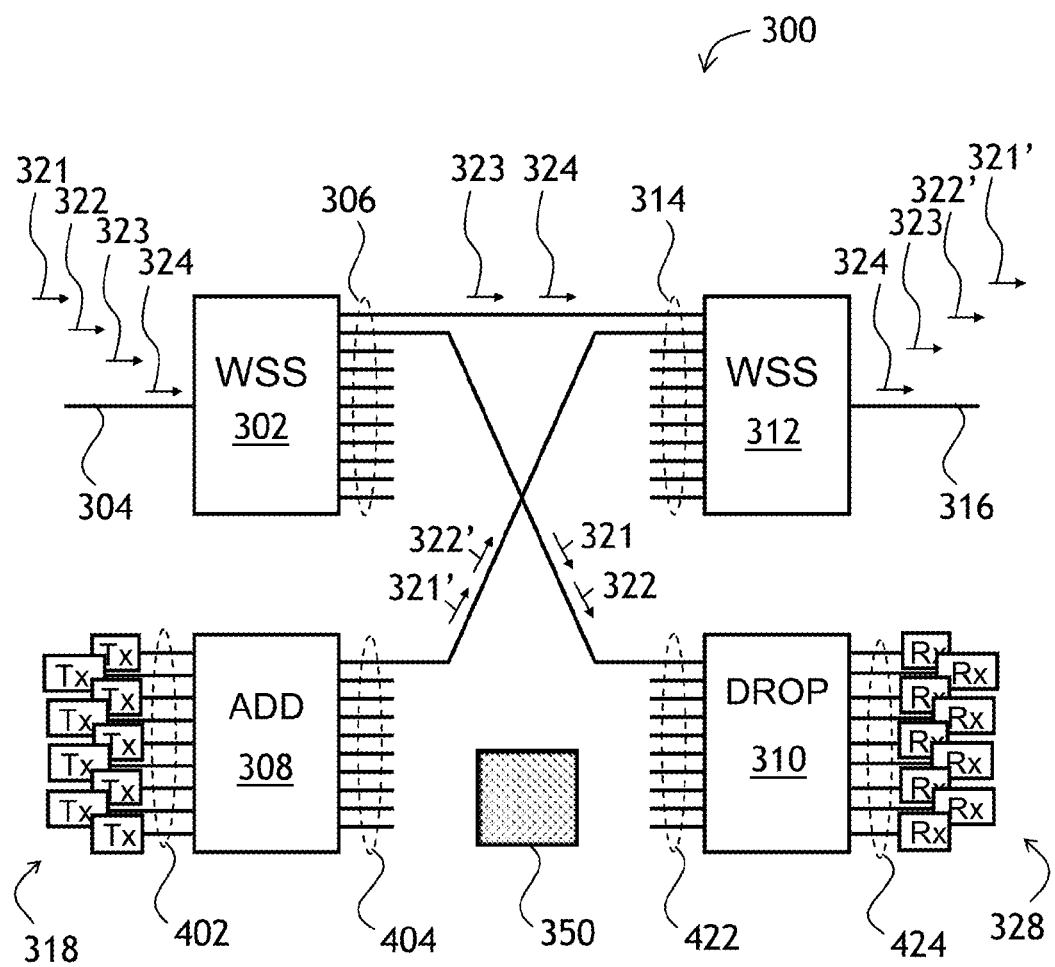
FIG. 3 is a block diagram of a single-direction colorless ROADM of the invention including "contentioned" ADD and DROP switches.

Referring to FIG. 3, a ROADM 300 includes one or more input WSS 302 (one illustrated for simplicity) having an input port 304 for inputting a plurality of original wavelength channels 321, 322, 323, and 324, and a plurality of intermediate ports 306 for outputting the wavelength channels 321, 322, 323 and 324 either individually or in groups as through wavelength channels, e.g. 323 and 324, or DROP wavelength channels, e.g. 321 and 322. The input wavelength-selective switch 302 is configured for independently redirecting the wavelength channels 321 to 324, on channel-by-channel basis, to the intermediate ports 306. To that end, the input WSS 302 can include a plurality of switching elements, e.g. MEMs mirrors, and a wavelength-selective coupler, e.g. diffraction grating and lensing, for directing the wavelength channels 321 to 324 from the input port 304 to individual switching elements, which couple the wavelength channels 321 to 324 to the individual output ports 306.

The ROADM 300 further includes one or more ADD switches 308, and one or more DROP switches 310, only one of each illustrated for simplicity. The ADD switch 308 includes a plurality of ingress ports 402 for launching a plurality of ADD wavelength channels and a plurality of egress ports 404 for outputting selected individual ADD wavelength channels or groups of ADD wavelength channels, and the DROP switch 310 includes a plurality of ingress ports 422 for receiving selected DROP wavelength channels from the one or more input WSS 302, and a plurality of egress ports 424 for outputting individual DROP wavelength channels or groups of DROP wavelength channels.

The ROADM 300 also includes an output WSS 312 having a plurality of entrance ports 314 for inputting original wavelength channels, e.g. 323 and 324, from the input WSS 302 and ADD wavelength channels, e.g. 321' and 322' to be combined and an exit port 316 for outputting the combined wavelength channels 321', 322', 323, and 324. Herein, the apostrophe (') denotes added first 321' and second 322' wavelength channels, which can be generated by optional transmitters 318 coupled to the ingress ports 402 of the ADD switch 308, to replace corresponding wavelength channels 321 and 322, which are being dropped for reception by optional receivers 328 coupled to the egress ports 424 of the DROP switch 310. The receivers 328 can include a coherent receiver, not shown, for tuning to different wavelength channels. The ADD 308 and DROP 310 switches are also wavelength-selective switches, and are called herein "ADD switch" and "DROP switch" to distinguish them from the input WSS 302 and the output WSS 312. Some of the intermediate ports 306, the entrance ports 314, the egress ports 404 of the ADD switch 308, and the ingress ports 422 of the DROP switch 310 may remain unoccupied for the purpose of future expansion of the ROADM 300 to accommodate more directions of communication. For example, initially the ROADM 300 can be used for an East-West direction, and in the future, more directions are added e.g. North-South, Southwest-Northeast, and so on; each added direction will require a separate connection to WSS and ADD and DROP switches of all other directions.

Adding and dropping wavelength channels is coordinated by a controller 350 coupled to the input 302 and output 312 WSS, and the ADD 308 and DROP 310 switches. Preferably, the controller 350 operates to prevent contentions between wavelength channels, for example the controller 350 can be configured to prevent two wavelength channels at a same center wavelength from simultaneously entering the DROP switch 310 or the output WSS 312. To that end, the controller 350 can include a look-up table stored in a non-transitional memory. The look-up table can include wavelength channels for each of the ADD switch 308, the DROP switch 310, the input WSS 302, and the output WSS 312. A software routine can be implemented to consult these look-up tables before adding or dropping new wavelength channels, to make sure a channel with a same channel number or center wavelength is not already present in the corresponding look-up table. The controller 350 can be disposed locally or remotely.

One of the ingress ports 422 of each DROP switch 310 is coupled to one of the intermediate ports 306 or each input WSS 302 for dropping the DROP wavelength channels e.g. the channels 321 and 322 shown on the right side of FIG. 3, which can be received locally by the receivers 328 or coupled to a fiber link, not shown, for reception at a remote location. One of the egress ports 404 of the ADD switch 308 is coupled to one of the entrance ports 314 or each output WSS 312 for adding the ADD wavelength channels, e.g. the first and second channels 321' and 322' shown on the left side of FIG. 3. One of the intermediate ports 306 of the input WSS 302 is coupled to one of the entrance ports 314 of the output WSS 212, for carrying the "through" wavelength channels, for example the channels 323 and 324 in the top middle of FIG. 3.

Figure 4A:
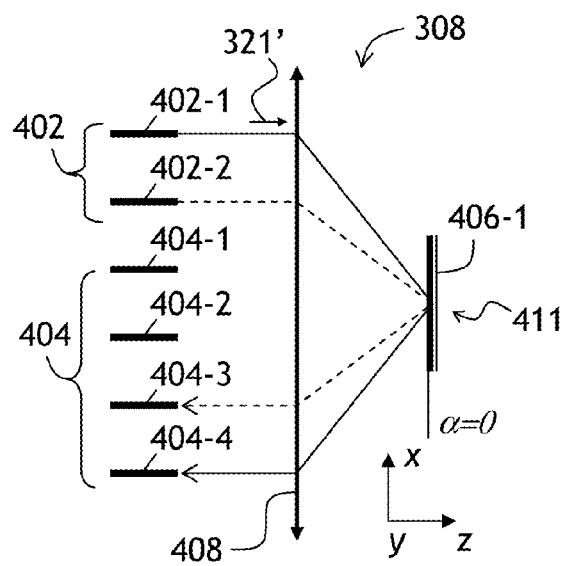
FIGS. 4A to 4C are block diagrams of the contentioned ADD switch of the ROADM of FIG. 3, showing a selector array and input/output ports.
Figure 4B:
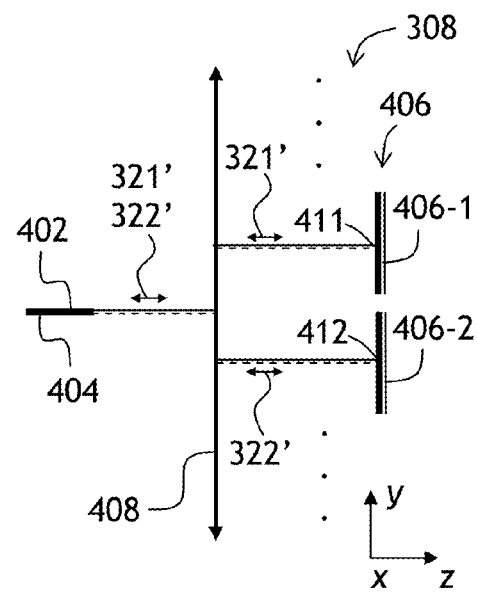

The construction of the ADD switch 308 will now be considered. Referring to FIGS. 4A and 4B with further reference to FIG. 3, the ingress ports 402 of the ADD switch 308 include first 402-1 and second 402-2 ingress ports, and the egress ports 404 of the ADD switch 308 include first 404-1 to fourth 404-4 egress ports. The ADD switch 308 further includes an array of directors 406 for redirecting wavelength channels, in this example first 406-1 and second 406-2 directors for redirecting the first 321' and second 322' added wavelength channels impinging on the first 406-1 and second 406-2 directors, respectively. The ADD switch 308 further includes a wavelength-selective coupler 408 for coupling the ingress ports 402 to the array of directors 406, and the array of directors to the egress ports 404.

FIG. 4A is in XZ plane, and FIG. 4B is in YZ plane. The wavelength-selective coupler 408 disperses the first 321' and second 322' wavelength channels along the Y axis (FIG. 4B), which is perpendicular to the plane of FIG. 4A. The array of directors 406, including the first 406-1 and second 406-2 directors, is also disposed along the Y axis (FIG. 4B), so that the first 406-1 and second 406-2 directors of the array 406 are disposed for receiving the first 321' and second 322' wavelength channels having different center wavelengths at first 411 and second 412 spaced apart locations, respectively. As seen in FIG. 4A, any and all wavelength channels with the same center wavelength, including the first wavelength channel 321', are received at the same, single location 411 of the first 406-1 director, no matter from which one of the ingress ports 402-1 and 402-2 it is received, albeit at a different angle of incidence. The same is true for any and all wavelength channels having the same center wavelength as the second wavelength channel 322', the optical path of which overlaps that of the first wavelength channel 321' in FIG. 4A. Generally, each director of the array 406 corresponds to a unique center wavelength, and each director is disposed with respect to the wavelength-selective coupler 408 for receiving any wavelength channel at the corresponding center wavelength at a single location from any one of the ingress ports 402.

Figure 4C:
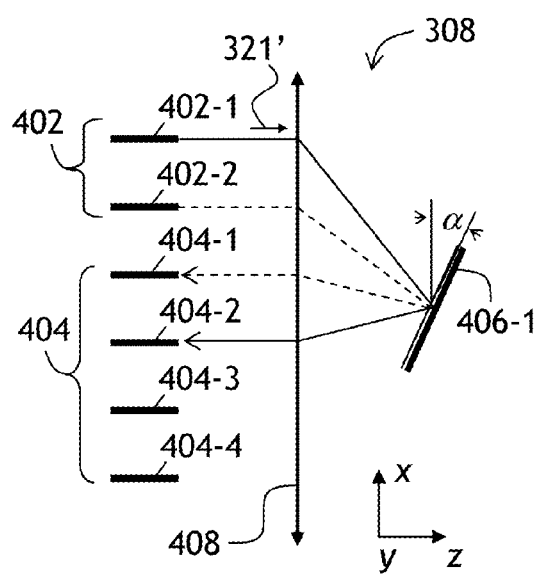

Referring specifically to FIG. 4A, each director of the array 406 has a plurality of independently controllable states. Each of these states defines, for the first 321' and second 322' wavelength channels respectively, a single coupling relationship between the ingress ports 402 and the egress ports 404, whereby the first 321' and second 322' wavelength channels are independently switchable by the first 406-1 and second 406-2 directors between the ingress 402 and the egress 404 ports. The directors 406 shown in FIGS. 4A to 4C are tiltable micro-electro-mechanical system (MEMS) mirrors. For the MEMS mirror implementation of the director array 406, the states are defined by an angle of tilt $\alpha$ of the MEMS mirrors. For instance, in FIG. 4A, the angle $\alpha=0$, whereby the first wavelength channel 321' is coupled from the first ingress port 402-1 to the fourth egress port 404-4. When the same first wavelength channel 321' is coupled to the second ingress port 402-2 at $\alpha=0$, it is directed to the third egress port 404-3. In FIG. 4C, the angle $\alpha$ is non-zero, whereby the first wavelength channel 321' is coupled from the first ingress port 402-1 to the second egress port 404-2. When another wavelength channel with the same center wavelength 321' is coupled to the second ingress port 402-2, it is directed by the same director 406-1, but to a different egress port, e.g. the first egress port 404-1. Therefore, each of the states of the director 406-1 defines a single coupling relationship between each ingress port 402 and the corresponding egress port 404. The number of the ingress ports 402 and the egress ports 404 may vary from two ingress ports 402 and two egress ports 404 to three, four, six, eight ports, and more ports. Other directors of the array 406 switch channels at different wavelengths in a similar way. As a result, different wavelength channels with different center wavelengths are independently switchable by different directors of the array 406 between the ingress 402 and the egress 404 ports of the ADD switch 308.

Figure 5:
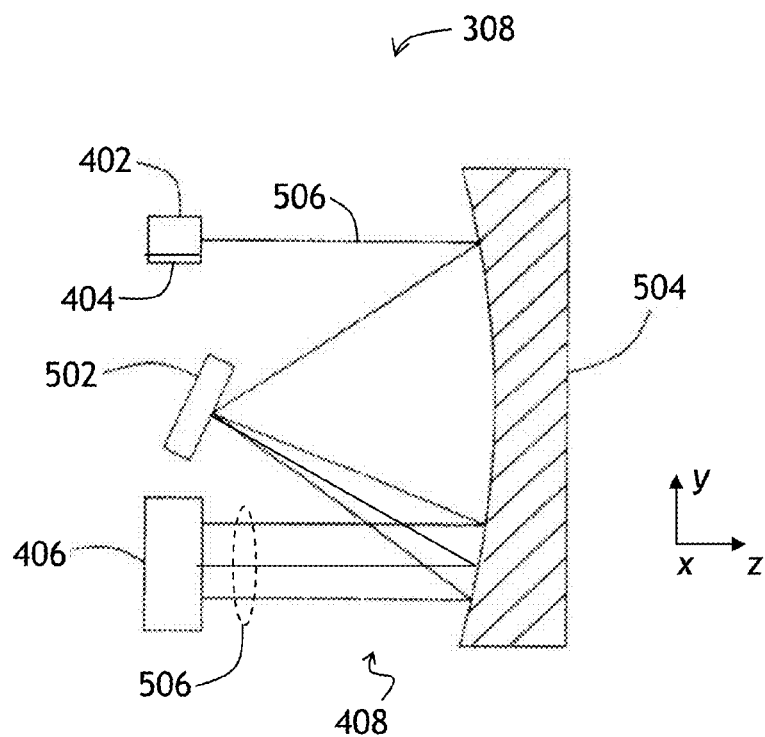
FIG. 5 is a schematic top view of the contentioned ADD switch of FIGS. 4A to 4C, showing construction of a wavelength-selective coupler.

The wavelength-selective coupler 408 of the ADD switch 308 will now be described. Referring to FIG. 5, the ADD switch 308 is shown in plan view in YZ plane, and the output ports 404 are disposed under the input ports 402. The wavelength-selective coupler 408 includes a diffraction grating 502 coupled to a concave mirror 504 disposed one focal length away from the diffraction grating 502. Wavelength channels 506 impinge on the concave mirror 504, which collimates and directs them to the diffraction grating 502, which in its turn disperses the individual wavelength channels 506 and directs them back to the concave mirror 504, which then focuses the wavelength dispersed channels 506 to the director array 406. The construction of the wavelength-selective coupler 408 is described in detail in U.S. Pat. No. 6,498, 872 by Bouevitch et al. The DROP switch 310 is constructed and operates in a same way as the ADD switch 308.

Figure 6:
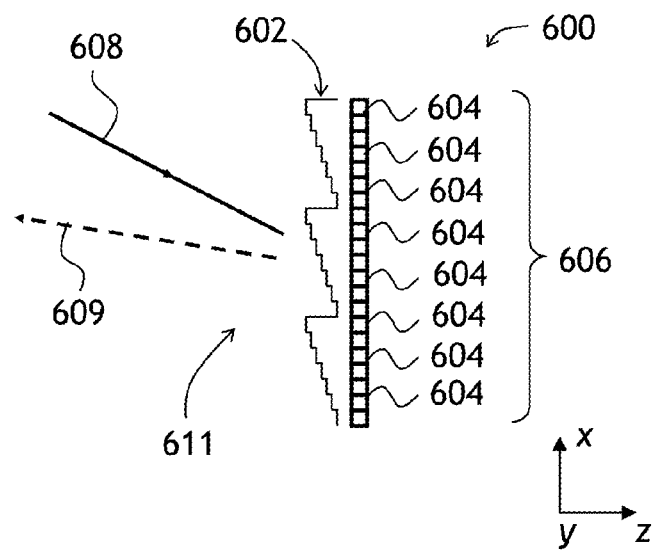
FIG. 6 is a schematic side view of an LCoS array usable in the contentioned ADD switch of FIGS. 4A to 4C.

In the embodiments of the ADD switch 308 shown in FIGS. 4A to 4C, the array of directors 406 includes a MEMS micromirror array. In this embodiment, each director of the director array, e.g. the first 406-1 and second 406-2 directors, includes a tiltable MEMS mirror for redirecting an impinging wavelength channel, e.g. the first 321' and second 322' wavelength channels impinging on the first 406-1 and second 406-2 directors. Other implementations of the director array 406 are possible. By way of a non-limiting example, the director array of the ADD 308 or DROP 310 switch can include an LCoS array 600, which is shown in FIG. 6 in XZ plane. Directors 606 of the LCoS array 600 are disposed on XY plane, that is, the directors 606 appear one under another in FIG. 6. Each director 606 includes a plurality of adjacent LCoS pixels 604, for imparting a phase retardation profile 602 to a wavelength channel 608 impinging on the plurality of adjacent LCoS pixels 604, thereby redirecting the impinging wavelength channel 608 to propagate in a direction 609. Each director 606 corresponds to a unique center wavelength, and each director 606 is disposed for receiving any wavelength channel at the corresponding center wavelength at a single location 611 from any ingress port. For example, when the LCoS array 600 of FIG. 6 is used in the ADD switch of FIGS. 4A and 4B, different directors 606 of the LCoS array 600 receive the first 321' and second 322' different wavelength channels at the first 411 and second 412 spaced apart single locations, respectively (FIG. 4B), from any one of the ingress ports 402, for independently imparting corresponding phase retardation profiles 602 (FIG. 6) to the first 321' and second 322' impinging wavelength channels (FIG. 4B), thereby redirecting the first 321' and second 322' wavelength channels. Each director of the array 606 has a plurality of independently controllable states, wherein each of the states defines a single coupling relationship between the ingress ports 402 and the egress ports 404, whereby different wavelength channels 321', 322' are independently switchable by the directors of the LCoS array 606 between the ingress 402 and the egress 404 ports.

The LCoS array implementation of the director array 406 has a number of important advantages. For example, the LCoS array 600 of FIG. 6 enables switching not only individual wavelength channels but entire wavelength bands including a plurality of wavelength channels, at any channel spacing required. Furthermore, the LCoS array 600 allows splitting of outgoing optical beams, enabling wavelength channel multicasting function. Coherent optical receiver(s), not shown in FIG. 3, can be coupled to egress port(s) 424 of the ROADM 300 having the LCoS array 600, for providing flexible bandwidth allocation for coherent detection.

Figure 7:
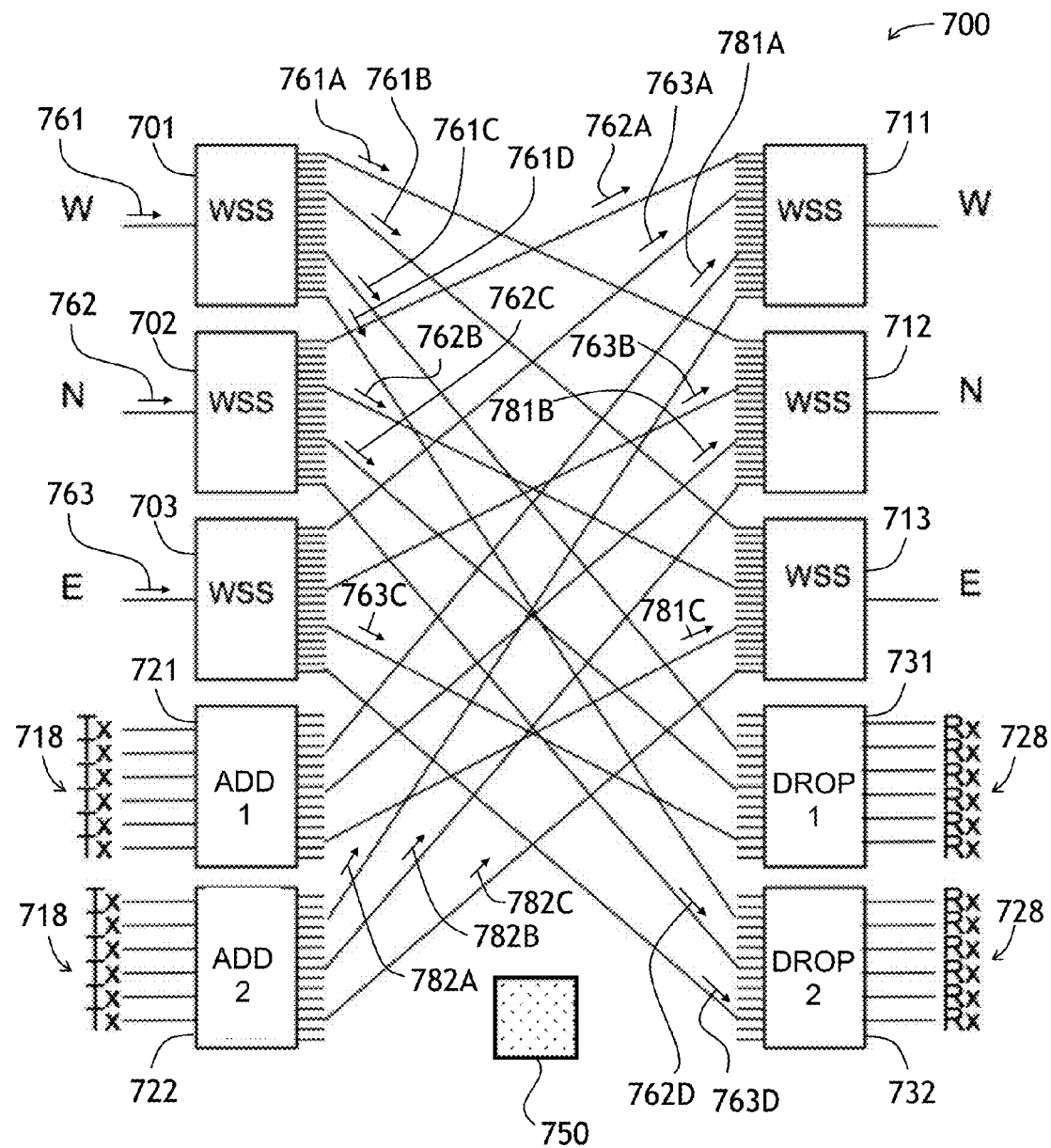
FIG. 7 is a block diagram of a colorless-directionless optical switching node of the invention.

The ROADM 300 of FIG. 3 can be expanded to add, drop, and forward wavelength channels traveling between two or more directions. Referring to FIG. 7, an optical switching node 700 includes three 1×N WSS 701, 702, and 703 for receiving wavelength division multiplexed signals 761, 762, and 763, each comprising a plurality of wavelength channels, e.g. 761a to 761d, 762a to 762d and 763a to 763d, respectively, from West (W), North (N), and East (E) directions, respectively. First and second ADD switches 721 and 722 are provided for adding wavelength channels 781A, 781B, 781C; and 782A, 782B, 782C, respectively, to the respective outgoing West ("W"; channels 781A and 782A), North ("N"; channels 781B and 782B), and East ("E"; channels 781C and 782C) directions. Three N×1 output WSS 711, 712, and 713 are provided for sending some wavelength channels e.g. 762A, 763A, 781A, and 782A to the West direction; some wavelength channels e.g. 761A, 763B, 781B, and 782B to the North direction; and some wavelength channels e.g. 761B, 762B, 781C, and 782C to the East direction, respectively. First and second DROP switches 731 and 732 are provided for dropping some wavelength channels e.g. 761C, 762C, 763C are dropped by the first DROP switch 731, and wavelength channels 761D, 762D, and 763D are dropped by the second DROP switch 732. A plurality of transmitters 718 can be coupled to the ADD switches 721 and 722, for generating the added optical channels 781A to 781C and 782A to 782C, respectively. A plurality of receivers 728 can be coupled to the DROP switches 731 and 732, for detecting the dropped wavelength channels 761C to 763C and 761D to 763D, respectively. The wavelength channel routing is coordinated by a controller 750 coupled to the input WSS 701 to 703; the output WSS 711 to 713; the ADD switches 721 and 722; and the DROP switches 731 and 732. Each optical switch on the left side of FIG. 7, that is, the input WSS 701 to 703 and the ADD switches 721 and 722, is coupled to each optical switch on the right side of FIG. 7, that is, the output WSS 711 to 713 and the DROP switches 731 and 732, with two exceptions. One exception is that the ADD switches 721 and 722 are not coupled directly to DROP switches 731 and 732, although such a connection may be provided for diagnostic purposes. The other exception is that the input West WSS 701 is not coupled directly to the output West WSS 711, the input North WSS 702 is not coupled directly to the output North WSS 712, and the input East WSS 701 is not coupled directly to the output East WSS 711, because usually, there is no requirement to send wavelength channels back to the same direction. However, such a connection may be an option, e.g. for diagnostic purposes. The connections shown in FIG. 7 provide the functionality of routing any one of the incoming wavelength channels 761 to 763 and added wavelength channels 781 and 782 to any of the West, North, and East directions, with the exceptions as explained above.

Still referring to FIG. 7 with further reference to FIG. 3, the optical switching node 700 of FIG. 7 can be thought of as including two ROADMs 300 of FIG. 3, in which one of the ingress ports 422 of the DROP switch 310 of a first one of the two ROADMs 300 is coupled to one of the intermediate ports 306 of a second one of the two ROADMs 300, and one of the egress ports 404 of the ADD switch 308 of the first ROADM 300 is coupled to one of the entrance ports 314 of the second ROADM 300, and vice versa; plus two more optional WSS e.g. for the East direction 703 and 713. The input and output East WSS 703 and 713 are provided to accommodate for the total of three directions, East, West, and North.

The number of directions can vary from node to node. For a node with only one direction, the ROADM 300 of FIG. 3 will suffice. For a node with two directions, two ROADMs 300 can be combined as explained above. For a node with three or more directions, additional input and output WSS can be provided, for as long as the port count of the WSS 701 to 703, 711 to 713, and ADD/DROP switches 721, 722, 731, and 732 has unoccupied ports left.

Using "contentioned" wavelength-selective switches, such as the ADD switches 308, 721, 722 and the DROP switches 310, 731, 732, instead of full M×N non-contentioned WSS, allows one to greatly simplify the ROADM structure, providing valuable cost savings and improving overall device reliability. However, contentioned switches can result in appearance of "undesired" connections of ingress and egress ports, which must be accounted for.

Figure 8:
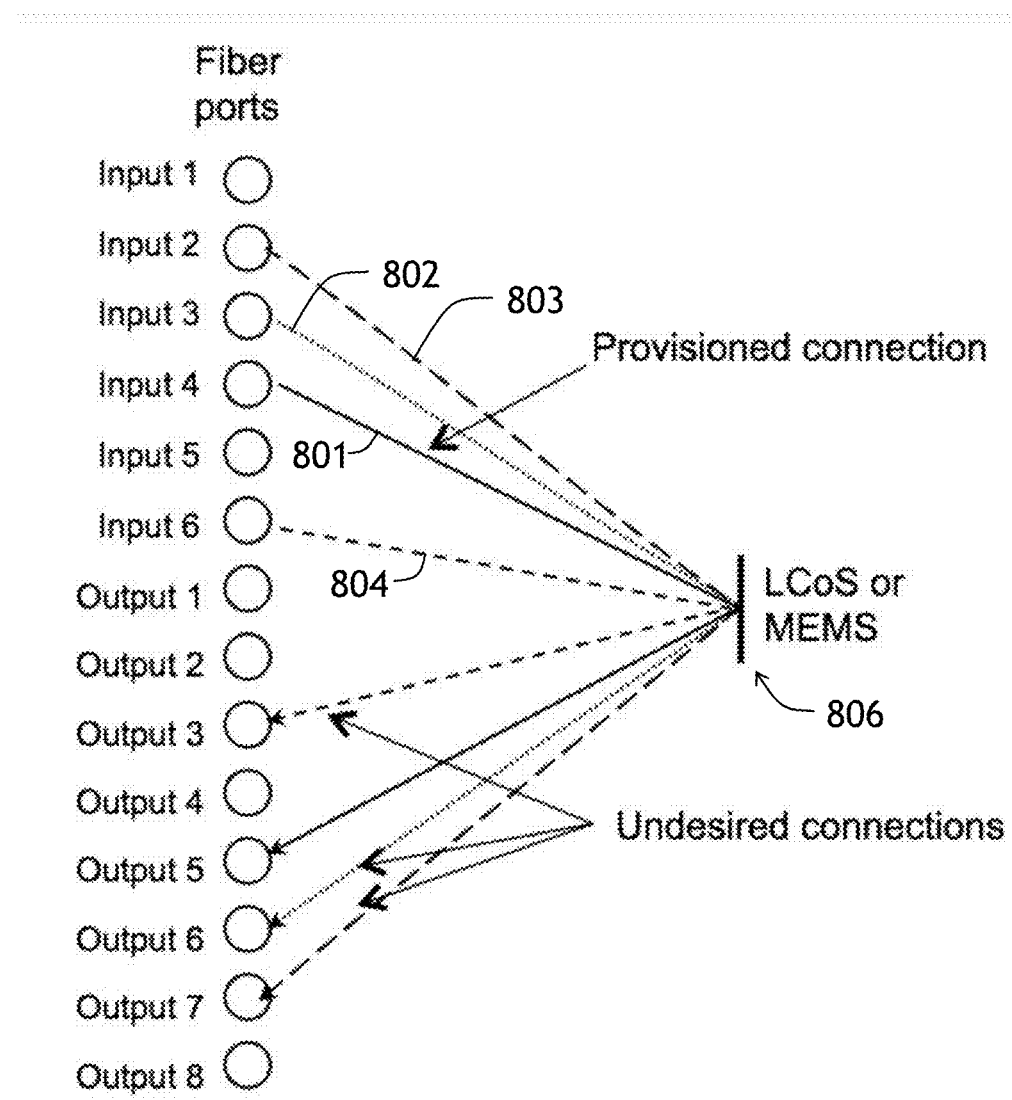
FIG. 8 is a schematic diagram showing contentioned ports in the ADD/DROP switches of FIGS. 4A to 4C and FIG. 7.

Referring to FIG. 8, these "undesired" connections are illustrated. When an LCoS or MEMS director 806 is in a state that couples Input 4 to Output 5, multiple "undesired connections" appear in addition to the "provisioned connection" 801 shown as a solid line. For example, Input 3 becomes connected to Output 6 (a dotted line 802). Furthermore, Input 2 becomes connected to Output 7 (a long-dashed line 803); Input 6 becomes connected to Output 3 (a short-dashed line 804); and so on.

Figure 9A:
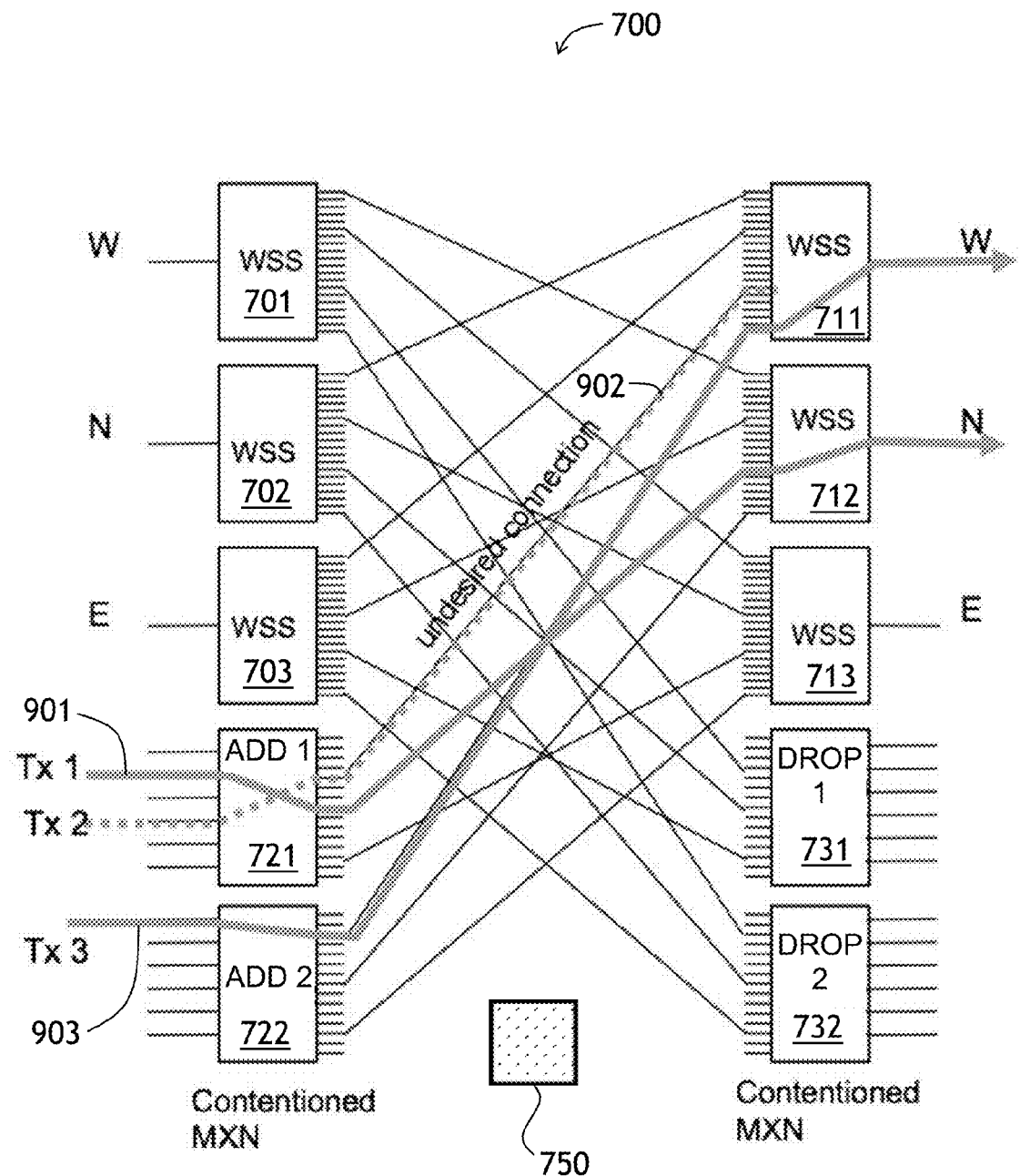
FIGS. 9A and 9B are block diagrams of the optical switching node of FIG. 7 showing an undesired connection in the ADD path (FIG. 9A) and in a DROP path (FIG. 9B) caused by the contentioned ports of FIG. 8.

These "undesired" connections are mitigated as follows. Referring to FIG. 9A, the top ADD switch 721 is configured to direct an optical channel generated by a first transmitter Tx1 at a first wavelength $\lambda_1$ to the North output WSS 712, as shown with a solid line 901. At the same time, a second transmitter Tx2 generates a wavelength channel at the same center wavelength $\lambda_1$. This wavelength channel is coupled to another input port of the top ADD switch 721. Since optical channels at a same center wavelength all get directed to a same director (see, e.g., FIG. 8, or FIG. 4A), the signal from the second transmitter Tx2 will be directed to some other destination, e.g. to the West output WSS 711, as shown with a dotted line 902 in FIG. 9A. To prevent this from happening, the controller 750 can be configured, e.g. programmed, to prevent any two of the plurality of transmitters 718 (FIG. 7), coupled to a same ADD switch 721 or 722, from simultaneously transmitting wavelength channels at a same center wavelength. The controller 750 can be disposed locally or remotely.

If another instance of a wavelength channel at a same center wavelength is required to be sent in another direction, e.g. the West output WSS 711, a third transmitter Tx3, coupled to the other ADD switch 722, can be used. The third transmitter Tx3 generates an optical channel, which is routed by the ADD switch 722 to go to the West output WSS 711, as shown by a corresponding solid line 903. The West output WSS 711 will select that signal to propagate to its exit port, thus automatically suppressing the undesired signal from the second transmitter Tx2. For LCoS implementations of the output WSS, the West output WSS 711 can be controlled to additionally suppress the undesired signal from the second transmitter Tx2.

Furthermore, even when the second transmitter Tx2 is tuned to a wavelength other than $\lambda_1$, any residual noise from the second transmitter Tx2 at the same channel wavelength $\lambda_1$ may be routed, as an "undesired connection", through the top ADD switch 721, as indicated by the dotted line 902. Typically this is not detected, but will happen systematically due to the selected routing for the signal from the first transmitter Tx1. The transmitters 718 typically generate a signal with strong power at their target wavelength, but also transmit low power noise at all other wavelengths within a communication band. The West WSS 711 on the line will suppress this noise and prevent it from interfering with the Tx3 signal. This will happen automatically, because a N×1 WSS such as the West WSS 711 selects only one of its entrance ports for each wavelength to go through to its exit port. For LCoS implementations of the output WSS, the West output WSS 711 can be controlled to additionally suppress the undesired signals.

Figure 9B:
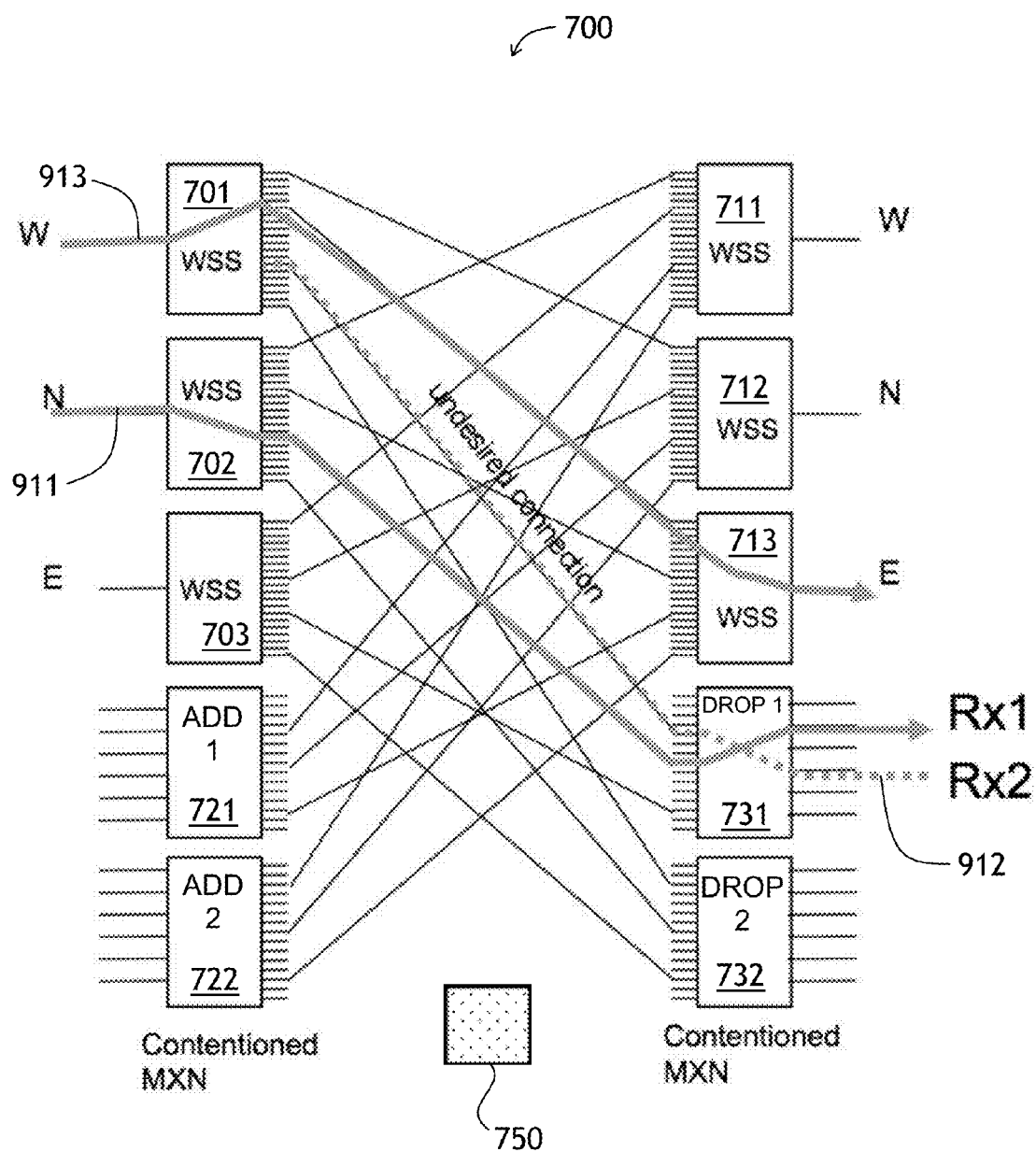

The situation is similar on the drop path. Referring now to FIG. 9B, the first (top) DROP switch 731 is configured to connect a first receiver Rx1 to receive a wavelength channel from the North direction at the center wavelength $\lambda_1$, as shown with a solid line 911. At the same time, an "undesired" connection at this wavelength appears with the West direction input WSS 701, as indicated with a dotted line 912 leading to a second receiver Rx2. The West-direction input WSS 701 is configured to couple a wavelength channel at the center wavelength $\lambda_1$ to the East output WSS 713 as shown with a line 913, thus automatically blocking the undesired connection 912. For LCoS implementations of the output WSS, the West output WSS 711 can be controlled to additionally suppress the undesired connection 912. To prevent wavelength contention at the first DROP switch 731, the controller 750 can be configured to prevent two wavelength channels at a same center wavelength from simultaneously entering the DROP switch 731, or any other ADD or DROP switch for that matter.

The principles of controlling contention of wavelength channels in the optical switching node 700 can also be applied to the ROADM 300 of FIG. 3. For instance, the controller 350 of the ROADM 300 can be configured to prevent any two of the plurality of transmitters 318 from simultaneously transmitting wavelength channels at a same center wavelength. The controller 350 can also be configured to prevent two wavelength channels at a same center wavelength from simultaneously entering the DROP switch 310.

Figure 10:
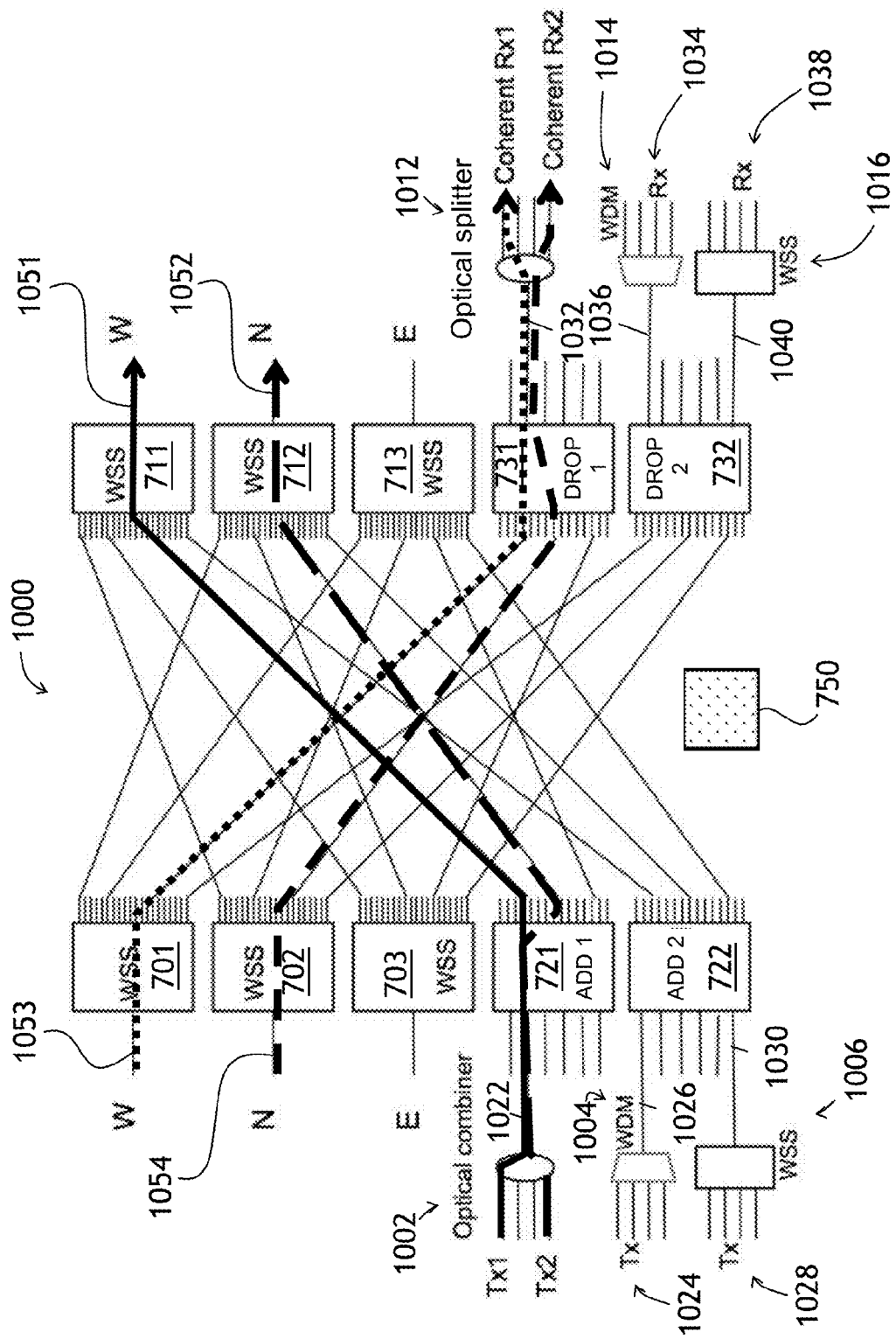
FIG. 10 is a block diagram of an embodiment of the optical switching node of FIG. 7 including various optical splitters and combiners for increasing add/drop port count.

Referring now to FIG. 10 with further reference to FIG. 7, an optical switching node 1000 of FIG. 10 is similar to the optical node 700 of FIG. 7. On the ADD side, the optical switching node 1000 includes an optical power combiner 1002 coupled to the top ADD switch 721; a WDM multiplexor 1004 coupled to the bottom ADD switch 722; and a N×1 WSS 1006 coupled to the bottom ADD switch 722. On the DROP side, the optical switching node 1000 includes an optical power splitter 1012 coupled to the top DROP switch 731; a WDM demultiplexor 1014 coupled to the bottom DROP switch 732; and a 1×N WSS 1016 coupled to the bottom DROP switch 732.

The optical power combiner 1002/splitter 1012; WDM multiplexor 1004/demultiplexor 1014; and N×1 WSS 1006/ 1×N WSS 1016 are used to bundle wavelength channels at single ingress ports of the ADD switches 721 and 722. For example, two transmitters Tx1 and Tx2 can be coupled to a single ingress port 1022 of the top ADD switch 721 via the optical power combiner 1002. A plurality of fixed-wavelength transmitters 1024 can be coupled to a single ingress port 1026 of the bottom ADD switch 722 via the WDM multiplexor 1004 which, as a rule, has a lower insertion loss than the optical power combiner 1002. A plurality of wavelength-tunable transmitters 1028 is coupled to a single ingress port 1030 of the bottom ADD switch 722 via the N×1 WSS 1006.

On the DROP side, two coherent optical receivers Rx1 and Rx2 are coupled to a single ingress port 1032 of the top DROP switch 731 via the optical power splitter 1012. A plurality of fixed-channel receivers 1034 are coupled to a single egress port 1036 of the bottom DROP switch 732 via the WDM demultiplexor 1014, which typically has a lower insertion loss than the optical power splitter 1012. A plurality of variable-channel receivers 1038 are coupled to a single egress port 1040 of the bottom DROP switch 732 via the 1×N WSS 1016.

In operation, the first transmitter Tx1 generates a wavelength channel that is coupled by the top ADD switch 721 to the West direction output WSS 711, as shown with a solid line 1051. The second transmitter Tx2 generates a wavelength channel that is coupled by the top ADD switch 721 to the North direction output WSS 712, as shown with a long-dashed line 1052. The first coherent receiver Rx1 receives a wavelength channel coming from the West direction via the West input WSS 701 and the top DROP switch 731, as indicated with a dotted line 1053. The second coherent receiver Rx2 receives a wavelength channel at a different wavelength, coming from the North direction via the North input WSS 702 and the top DROP switch 731, as indicated with short-dashed line 1054. The reception of the two incoming wavelength channels is not impeded by propagating through the common optical power splitter 1012, because the coherent receivers Rx1 and Rx2 include internal optical oscillators, which can be tuned to the corresponding center wavelengths. The transmitters 1024 and 1028, and the receivers 1014 and 1038 can send and receive other wavelength channels, not shown. These wavelength channels are routed through the bottom ADD 722 and DROP 732 switches, respectively. While different wavelength channels are routed through the optical switching node 1000, the wavelength contention constraints are applied by the controller 750, as described above. The optical splitters and combiners, including the optical power splitter 1012, the optical power combiner 1002, the WDM demultiplexor 1014, the WDM multiplexor 1004, the 1×N WSS 1016, and the N×1 WSS 1006, can also be coupled to selected ones of the egress ports 424 of the DROP switch 310; and/or to selected ones of the ingress ports 402 of the ADD switch 308 of the ROADM 300 of FIG. 3, for splitting or combining corresponding optical signals at the selected egress/ingress ports.

Figure 11:
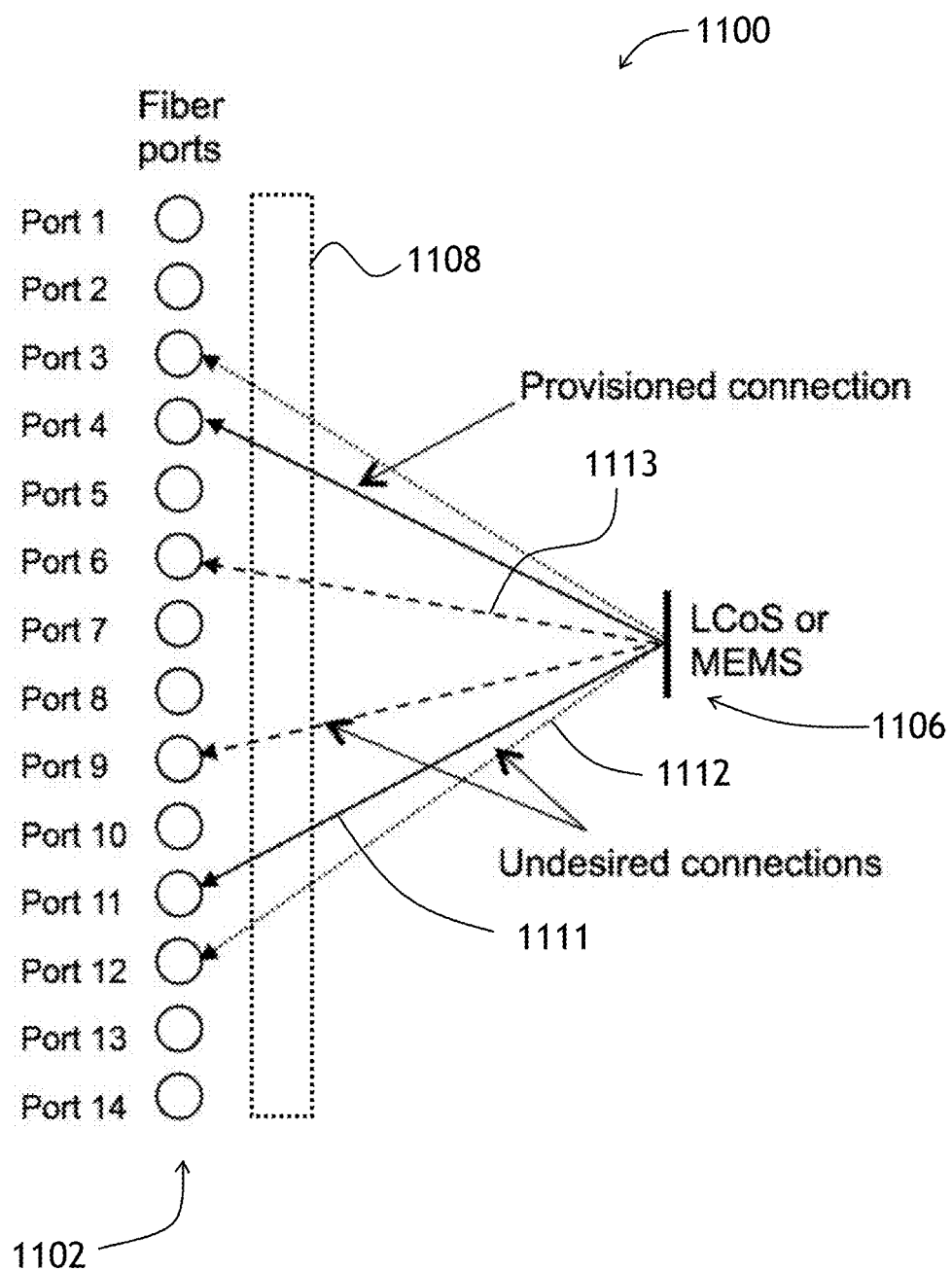
FIG. 11 is a schematic diagram of a contentioned ADD/DROP switch of the invention, showing assignment of some of its port as input ports and other ports as output ports.

The ADD and DROP switches 308, 310 (FIG. 3); 721, 722, 731, and 732 (FIG. 7) are bidirectional devices, affording a flexibility in assigning some of their ports as input ports and other ports as output ports. Turning to FIG. 11, a contentioned optical switch 1100 is similar to the ADD switch 308 of FIG. 3, and the ADD switches 721 and 722 of FIG. 7. The contentioned optical switch 1100 has a total of fourteen ports 1102 coupled via a wavelength-selective coupler 1108 to a director array 1106, establishing, for each wavelength channel, a unique coupling relationship between the fourteen ports 1102. For example, when a connection 1111 is provisioned between Port 4 and Port 11, a connection 1112 is established between Port 3 and Port 12, a connection 1113 is established between Port 6 and Port 9, and so on. The connections 1111, 1112, and 1113 are bidirectional, which means that any of the Ports 1 to 14 can be used as an input port or an output port. Therefore, the fourteen-port contentioned optical switch 1100 can have two input ports and twelve output ports; three input ports and eleven output ports; four input ports and ten output ports; and so on, for as long as the total number of ports does not exceed the total number of ports 1102 (fourteen in this case).

Figure 12:
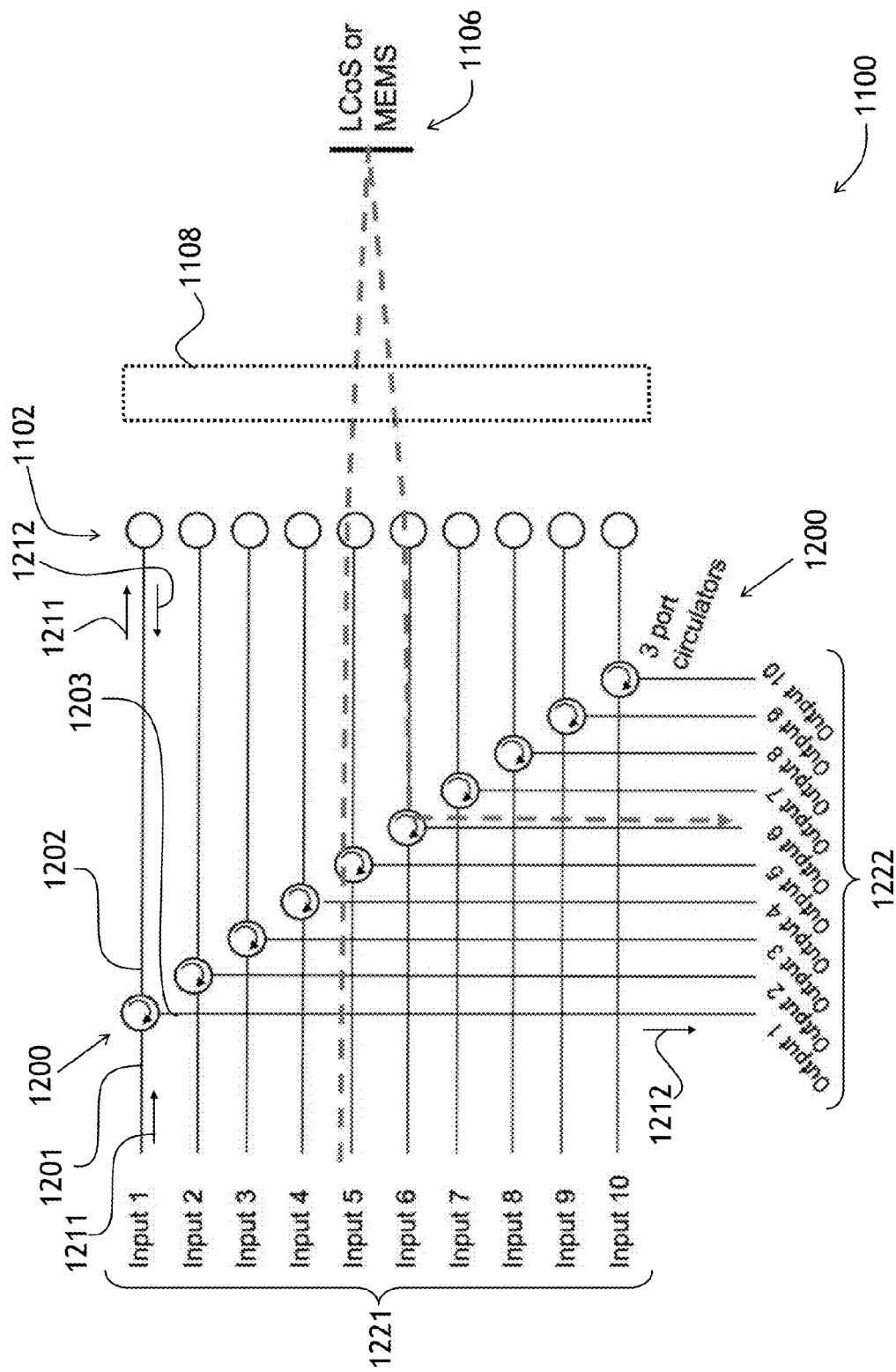
FIG. 12 a schematic diagram of an embodiment of the ADD/DROP switch of FIG. 11 using optical circulators to increase the total port count.

Furthermore, the number of ports can be effectively doubled by using three-way optical circulators or splitters. Referring to FIG. 12 with further reference to FIG. 11, a plurality of circulators 1200 are coupled to the wavelength-selective means 1108 of the contentioned optical switch 1100. Each of the circulators 1200 has an input port 1201 for inputting an optical signal 1211, a common port 1202 for transmitting the optical signal 1211 and receiving a reflected optical signal 1212, and an output port 1203 for outputting the reflected optical signal 1212. The common ports 1202 of the plurality of circulators 1200 are coupled to the wavelength-selective coupler 1108, and each input 1201 and output port 1203 of each one of the plurality of circulators 1200 is coupled to a unique one of the ingress 1221 and egress ports 1222, respectively, of the optical switch 1100. The optical switch 1100 can be used as the ADD switch 308 and/or the DROP switch 310 in the ROADM 300 of FIG. 3; and the ADD switches 721, 722 and/or DROP switches 731, 732 in the optical switching node 700 of FIGS. 7, 9A, 9B, or FIG. 10.

Figure 13:
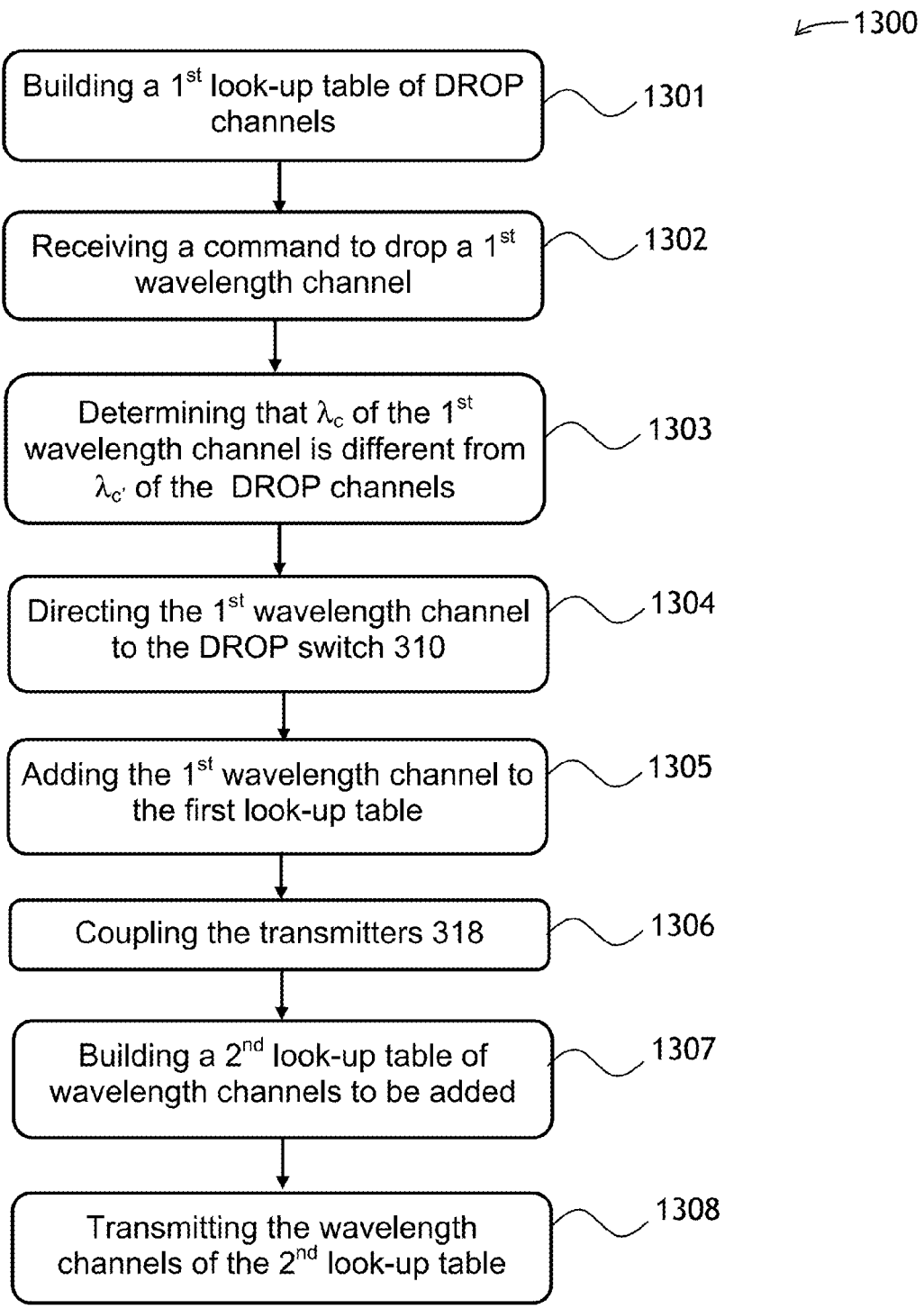
FIGS. 13 and 14 are flow charts of methods of controlling the ROADM of FIG. 3 and the optical switching node of FIG. 7, respectively.

Methods of controlling the ROADM 300 of FIG. 3 and the optical switching node 700 of FIGS. 7, 9A, 9B, and FIG. 10 will now be described. Referring to FIG. 13, a method 1300 for controlling the ROADM 300 of FIG. 3 includes a step 1301 of building a first look-up table of DROP wavelength channels directed from the input port 304 to the DROP switch 310, for example the first two channels 321 and 322 as shown in FIG. 3. Each wavelength channel of the first look-up table has a center wavelength that is different from a center wavelength of every other channel in the first look-up table; in this example, the first two channels 321 and 322 have different center wavelengths. Upon completion of the step 1301, in a step 1302, a command is received by the controller 350 to drop another wavelength channel, e.g. a first wavelength channel. Upon completion of the step 1302, in a step 1303, a check is performed that a center wavelength $\lambda_c$ of the first wavelength channel is different from a center wavelength of every DROP wavelength channel in the first look-up table. When the center wavelength $\lambda_c$ is different, then in a step 1304, the input WSS 302 is controlled by the controller 350 to direct the first wavelength channel to the DROP switch 310, e.g. for detection by a coherent receiver. Also upon performing the wavelength check in the step 1303, in a step 1305, the first wavelength channel is added to the first look-up table. When the center wavelength $\lambda_c$ of the first wavelength channel is determined to be the same as one of the center wavelengths $\lambda_{c'}$ of the first look-up table, the first wavelength channel is not dropped, and a corresponding error message is sent instead.

In an optional step 1306, the plurality of transmitters 318 are coupled to the ingress ports 402 of the ADD switch 308. In an optional step 1307, a second look-up table is built including ADD wavelength channels to be added to the exit port 316 via the ADD switch 308, e.g. the first and second ADD channels 321' and 322'. Each ADD wavelength channel of the second look-up table has a center wavelength $\lambda_c$ that is different from a center wavelength of every other ADD wavelength channel in the second look-up table. Then, in an optional step 1308, the controller 350 causes the plurality of transmitters 318 to transmit the ADD wavelength channels of the second look-up table, i.e. the first and second ADD channels 321' and 322' in this example.

Figure 14:
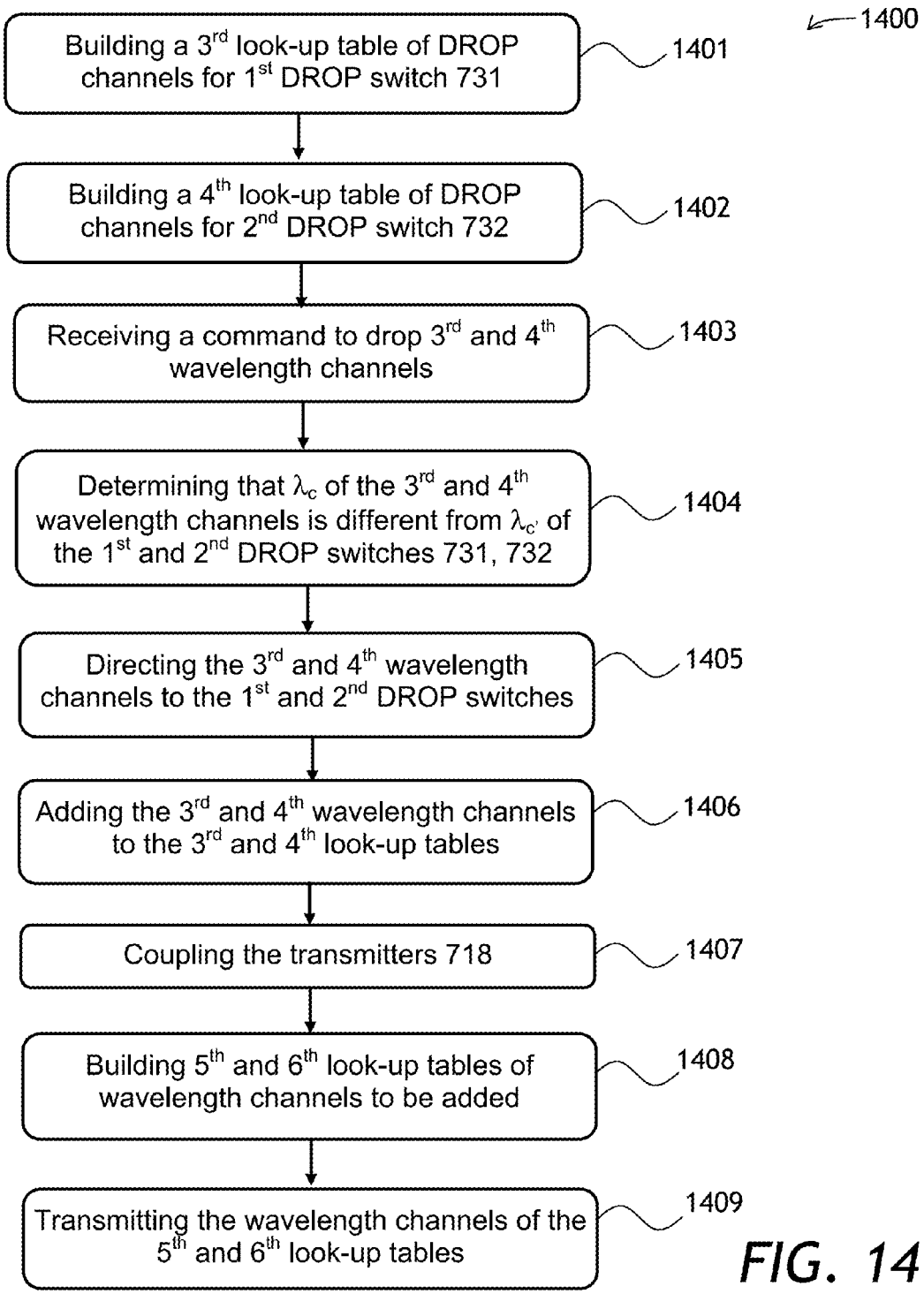

Turning to FIG. 14, a method 1400 for controlling the ROADM 700 of FIG. 7 includes a step 1401 of building a third look-up table of DROP wavelength channels to be directed from the input ports of the West and North directions, to the first (top) DROP switch 731, e.g. the wavelength channels 761C and 762C. Each wavelength channel of the third look-up table has a center wavelength that is different from a center wavelength of every other channel. In a step 1402, a fourth look-up table of DROP wavelength channels is built, including wavelength channels to be directed from the input ports of the West and North directions to the second (bottom) DROP switch 732, e.g. the wavelength channels 761D and 762D. Again, each wavelength channel of the fourth look-up table has a center wavelength that is different from a center wavelength of every other channel.

Upon completion of the look-up table building steps 1401 and 1402, in a step 1403, a command is received by the controller 750 to drop a third wavelength channel to the first (top) DROP switch 731, and a fourth wavelength channel to the second (bottom) DROP switch 732. Upon completion of this step, in a step 1404, a check is performed that center wavelengths of the third and fourth wavelength channels are different from a center wavelength of every DROP wavelength channel in the third and fourth look-up tables, respectively. If this is the case, then in a step 1405, the input West WSS 701 and North WSS 702 are controlled by the controller 750 to direct the third and fourth wavelength channels to the DROP switches 731 and 732, respectively, on different egress ports or at a same egress port, e.g. for detection by a coherent receiver. Also upon performing the wavelength check in the step 1404, in a step 1406, the third and fourth wavelength channels are added to the third and fourth look-up tables, respectively. When the center wavelength of the third or fourth wavelength channels is the same as one of the center wavelengths of the respective third or fourth look-up tables, the third or fourth wavelength channel is not dropped, and a corresponding error message is sent instead.

In an optional step 1407, first and second pluralities of transmitters 718 are coupled to the ingress ports of the first (top) ADD switch 721 and the second (bottom) ADD switch 722, respectively. Then, in an optional step 1408, fifth and sixth look-up tables are built, including ADD wavelength channels to be added via the first and second ADD switches 721 and 722, respectively, e.g. the ADD channels 781A to 781C and 782A to 782C, respectively. Each ADD wavelength channel of the fifth and sixth look-up tables has a center wavelength that is different from a center wavelength of every other ADD wavelength channel in the fifth and sixth look-up tables, respectively. Then, in an optional step 1409, the controller 750 causes the first and second pluralities of transmitters 718 to transmit he ADD wavelength channels of the fifth and sixth look-up tables, respectively.

The hardware used to implement the controller 350 and 750 described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A ROADM comprising:
at least one input wavelength-selective switch (WSS) having an input port for inputting a plurality of input wavelength channels, and a plurality of intermediate ports, wherein the input WSS is configured for independently redirecting the input wavelength channels to the intermediate ports for output as through or DROP wavelength channels;
at least one ADD switch, each comprising:
  a plurality of ingress ports for launching ADD wavelength channels,
  a plurality of egress ports for outputting the ADD wavelength channels,
  a first array of directors for redirecting the ADD wavelength channels impinging thereon to a selected egress port, and
  a first wavelength-selective coupler for coupling the ingress ports to the array of directors, and the array of directors to the egress ports,
at least one DROP switch, each comprising:
  a plurality of ingress ports, one of which coupled to one of the intermediate ports of the input WSS for receiving the DROP wavelength channels,
  a plurality of egress ports for outputting the DROP wavelength channels,
  a second array of directors for redirecting the DROP wavelength channels impinging thereon to a selected one of the egress ports, and
  a second wavelength-selective coupler for coupling the ingress ports to the second array of directors, and the second array of directors to the egress ports,
  wherein each director of the first and second arrays corresponds to a unique center wavelength, and each director is disposed with respect to the respective wavelength-selective coupler for receiving any and all wavelength channels at the corresponding center wavelength at a single location from any one of the ingress ports, wherein each director has a plurality of independently controllable states, wherein each of the states defines a single coupling relationship between the ingress ports and the egress ports, whereby different wavelength channels are independently switchable by different directors of the array between the ingress and the egress ports;
at least one output WSS having a plurality of entrance ports, each of the entrance ports coupled to a respective one of the intermediate ports of each input WSS or a respective one of the egress ports of each ADD switch for inputting the through and ADD wavelength channels to be combined into an output WDM signal, and an exit port for outputting the output WDM signal; and
a controller coupled to the input and output WSS and the ADD and DROP switches, for controlling wavelength channel routing therethrough.

2. The ROADM of claim 1, wherein the director array of the ADD or DROP switch comprises a LCoS array, wherein each director of the director array comprises a plurality of adjacent LCoS pixels, for imparting a phase retardation profile to a wavelength channel impinging on the plurality of adjacent LCoS pixels, thereby redirecting the impinging wavelength channel.

3. The ROADM of claim 1, wherein the director array of the ADD or DROP switch comprises a MEMS micromirror array, wherein each director of the director array comprises a tiltable MEMS mirror for redirecting a wavelength channel impinging thereon.

4. The ROADM of claim 1, further comprising a plurality of transmitters each coupled to a particular one of the ingress ports of the ADD switch, wherein the controller is configured to prevent any two of the plurality of transmitters from simultaneously transmitting wavelength channels at a same center wavelength.

5. The ROADM of claim 1, wherein the controller is configured to prevent two wavelength channels at a same center wavelength from simultaneously entering the DROP switch.

6. The ROADM of claim 1, further comprising a plurality of receivers each coupled to a particular one of the egress ports of the DROP switch, wherein the plurality of receivers includes a coherent receiver for tuning to more than one wavelength channel.

7. The ROADM of claim 1, further comprising an optical combiner coupled to a selected one of the ingress ports of the ADD switch, for combining individual wavelength channels into an optical signal, and coupling the optical signal to the selected ingress port of the ADD switch.

8. The ROADM of claim 7, further comprising an optical splitter coupled to a selected one of the egress ports of the DROP switch, for splitting an optical signal at the selected egress port.

9. The ROADM of claim 8, wherein the optical splitter or the optical combiner is selected from the group consisting of an optical power splitter/combiner, a WDM multiplexor/demultiplexor, and a WSS.

10. An optical switching node comprising two ROADMs of claim 1,
  wherein one of the ingress ports of the DROP switch of a first one of the two ROADMs is coupled to one of the intermediate ports of a second one of the two ROADMs, and one of the egress ports of the ADD switch of the first ROADM is coupled to one of the entrance ports of the second ROADM.

11. A ROADM comprising:
at least one input wavelength-selective switch (WSS) having an input port for inputting a plurality of input wavelength channels, and a plurality of intermediate ports, wherein the input WSS is configured for independently redirecting the input wavelength channels to the intermediate ports for output as through or DROP wavelength channels;
at least one ADD switch, each comprising:
  a plurality of ingress ports for launching ADD wavelength channels,
  a plurality of egress ports for outputting the ADD wavelength channels,
  a first array of directors for redirecting the ADD wavelength channels impinging thereon to a selected egress port, and
  a first wavelength-selective coupler for coupling the ingress ports to the array of directors, and the array of directors to the egress ports,
at least one DROP switch, each comprising:
  a plurality of ingress ports, one of which coupled to one of the intermediate ports of the input WSS for receiving the DROP wavelength channels,
  a plurality of egress ports for outputting the DROP wavelength channels,
  a second array of directors for redirecting the DROP wavelength channels impinging thereon to a selected one of the egress ports, and
  a second wavelength-selective coupler for coupling the ingress ports to the second array of directors, and the second array of directors to the egress ports,
  wherein each director of the first and second arrays corresponds to a unique center wavelength, and each director is disposed with respect to the respective wavelength-selective coupler for receiving any and all wavelength channels at the corresponding center wavelength at a single location from any one of the ingress ports, wherein each director has a plurality of independently controllable states, wherein each of the states defines a single coupling relationship between the ingress ports and the egress ports, whereby different wavelength channels are independently switchable by different directors of the array between the ingress and the egress ports;

at least one output WSS having a plurality of entrance ports, each of the entrance ports coupled to a respective one of the intermediate ports of each input WSS or a respective one of the egress ports of each ADD switch for inputting the through and ADD wavelength channels to be combined into an output WDM signal, and an exit port for outputting the output WDM signal, wherein at least one of the ADD and DROP switches comprises a plurality of optical circulators each having an input port, a common port, and an output port, wherein the common ports of the plurality of circulators are coupled to the wavelength-selective coupler of the least one of the ADD and DROP switches, and each input and output port of each one of the plurality of circulators is coupled to a unique one of the ingress and egress ports, respectively, of the least one of the ADD and DROP switches.

12. An optical switching node comprising:

two ROADMS, each comprising:

at least one input wavelength-selective switch (WSS) having an input port for inputting a plurality of input wavelength channels, and a plurality of intermediate ports, wherein the input WSS is configured for independently redirecting the input wavelength channels to the intermediate ports for output as through or DROP wavelength channels;

at least one ADD switch, each comprising:

a plurality of ingress ports for launching ADD wavelength channels, a plurality of egress ports for outputting the ADD wavelength channels, a first array of directors for redirecting the ADD wavelength channels impinging thereon to a selected egress port, and a first wavelength-selective coupler for coupling the ingress ports to the array of directors, and the array of directors to the egress ports, at least one DROP switch, each comprising:

a plurality of ingress ports, one of which coupled to one of the intermediate ports of the input WSS for receiving the DROP wavelength channels, a plurality of egress ports for outputting the DROP wavelength channels, a second array of directors for redirecting the DROP wavelength channels impinging thereon to a selected one of the egress ports, and a second wavelength-selective coupler for coupling the ingress ports to the second array of directors, and the second array of directors to the egress ports, wherein each director of the first and second arrays corresponds to a unique center wavelength, and each director is disposed with respect to the respective wavelength-selective coupler for receiving any and all wavelength channels at the corresponding center wavelength at a single location from any one of the ingress ports, wherein each director has a plurality of independently controllable states, wherein each of the states defines a single coupling relationship between the ingress ports and the egress ports, whereby different wavelength channels are independently switchable by different directors of the array between the ingress and the egress ports;

at least one output WSS having a plurality of entrance ports, each of the entrance ports coupled to a respective one of the intermediate ports of each input WSS or a respective one of the egress ports of each ADD switch for inputting the through and ADD wavelength channels to be combined into an output WDM signal, and an exit port for outputting the output WDM signal; and a controller coupled to the input and output WSS and the ADD and DROP switches of the first and second ROADMs, for controlling wavelength channel routing therethrough, wherein the controller is configured for routing individual wavelength channels so as to prevent two wavelength channels at a same center wavelength from simultaneously entering a same one of the ADD or DROP switches of the first and second ROADMs.

13. The optical switching node of claim 12, further comprising a plurality of transmitters each coupled to a particular one of the ingress ports of the ADD switches of the first and second ROADMs, wherein the controller is configured to prevent any two of the plurality of transmitters coupled to a same one of the ADD switches of the first and second ROADMs from simultaneously transmitting wavelength channels at a same center wavelength.

14. A method of wavelength-selective routing of optical signals, the method comprising:

(a) providing a ROADM comprising:

at least one input wavelength-selective switch (WSS) having an input port for inputting a plurality of input wavelength channels, and a plurality of intermediate ports, wherein the input WSS is configured for independently redirecting the input wavelength channels to the intermediate ports for output as through or DROP wavelength channels;

at least one ADD switch, each comprising:

a plurality of ingress ports for launching ADD wavelength channels, a plurality of egress ports for outputting the ADD wavelength channels, a first array of directors for redirecting the ADD wavelength channels impinging thereon to a selected egress port, and a first wavelength-selective coupler for coupling the ingress ports to the array of directors, and the array of directors to the egress ports, at least one DROP switch, each comprising:

a plurality of ingress ports, one of which coupled to one of the intermediate ports of the input WSS for receiving the DROP wavelength channels, a plurality of egress ports for outputting the DROP wavelength channels, a second array of directors for redirecting the DROP wavelength channels impinging thereon to a selected one of the egress ports, and a second wavelength-selective coupler for coupling the ingress ports to the second array of directors, and the second array of directors to the egress ports, wherein each director of the first and second arrays corresponds to a unique center wavelength, and each director is disposed with respect to the respective wavelength-selective coupler for receiving any and all wavelength channels at the corresponding center wavelength at a single location from any one of the ingress ports, wherein each director has a plurality of independently controllable states, wherein each of the states defines a single coupling relationship between the ingress ports and the egress ports, whereby different wavelength channels are independently switchable by different directors of the array between the ingress and the egress ports;

at least one output WSS having a plurality of entrance ports, each of the entrance ports coupled to a respective one of the intermediate ports of each input WSS or a respective one of the egress ports of each ADD switch for inputting the through and ADD wavelength channels to be combined into an output WDM signal, and an exit port for outputting the output WDM signal;

(b) building a first look-up table of DROP wavelength channels directed from the input port to the DROP switch, wherein each DROP wavelength channel of the first look-up table has a center wavelength that is different from a center wavelength of every other channel in the first look-up table;

(c) upon completion of step (b), receiving a command to drop a first wavelength channel;

(d) upon completion of step (c), determining that a center wavelength of the first wavelength channel is different from a center wavelength of every DROP wavelength channel in the first look-up table;

(e) upon completion of step (d), controlling the input WSS to direct the first wavelength channel to the DROP switch; and (f) upon completion of step (d), adding the first wavelength channel to the first look-up table.

15. The method of claim 14, further comprising (g) coupling a plurality of transmitters to the ingress ports of the ADD switch;

(h) building a second look-up table of ADD wavelength channels to be added to the exit port via the ADD switch, wherein each ADD wavelength channel of the second look-up table has a center wavelength that is different from a center wavelength of every other ADD wavelength channel in the second look-up table; and (i) upon completion of step (h), causing the plurality of transmitters to transmit the ADD wavelength channels of the second look-up table.

16. A method of wavelength-selective routing of optical signals, the method comprising:

(A) providing an optical switching node comprising two ROADMs, each comprising:

at least one input wavelength-selective switch (WSS) having an input port for inputting a plurality of input wavelength channels, and a plurality of intermediate ports, wherein the input WSS is configured for independently redirecting the input wavelength channels to the intermediate ports for output as through or DROP wavelength channels;

at least one ADD switch, each comprising:
 a plurality of ingress ports for launching ADD wavelength channels,
 a plurality of egress ports for outputting the ADD wavelength channels,
 a first array of directors for redirecting the ADD wavelength channels impinging thereon to a selected egress port, and
 a first wavelength-selective coupler for coupling the ingress ports to the array of directors, and the array of directors to the egress ports, at least one DROP switch, each comprising:
 a plurality of ingress ports, one of which coupled to one of the intermediate ports of the input WSS for receiving the DROP wavelength channels,
 a plurality of egress ports for outputting the DROP wavelength channels,
 a second array of directors for redirecting the DROP wavelength channels impinging thereon to a selected one of the egress ports, and
 a second wavelength-selective coupler for coupling the ingress ports to the second array of directors, and the second array of directors to the egress ports, wherein each director of the first and second arrays corresponds to a unique center wavelength, and each director is disposed with respect to the respective wavelength-selective coupler for receiving any and all wavelength channels at the corresponding center wavelength at a single location from any one of the ingress ports, wherein each director has a plurality of independently controllable states, wherein each of the states defines a single coupling relationship between the ingress ports and the egress ports, whereby different wavelength channels are independently switchable by different directors of the array between the ingress and the egress ports;

at least one output WSS having a plurality of entrance ports, each of the entrance ports coupled to a respective one of the intermediate ports of each input WSS or a respective one of the egress ports of each ADD switch for inputting the through and ADD wavelength channels to be combined into an output WDM signal, and an exit port for outputting the output WDM signal;

(B) coupling one of the ingress ports of the DROP switch of a first one of the two ROADMs to one of the intermediate ports of a second one of the two ROADMs, and coupling one of the egress ports of the ADD switch of the first ROADM to one of the entrance ports of the second ROADM;

(C) building a third look-up table of DROP wavelength channels directed from the input ports of the first and second ROADMs to the DROP switch of the first ROADM, wherein each DROP wavelength channel of the third look-up table has a center wavelength that is different from a center wavelength of every other channel in the third look-up table;

(D) building a fourth look-up table of DROP wavelength channels directed from the input ports of the first and second ROADMs to the DROP switch of the second ROADM, wherein each DROP wavelength channel of the fourth look-up table has a center wavelength that is different from a center wavelength of every other DROP wavelength channel in the fourth look-up table;

(E) upon completion of steps (C) and (D), receiving a command to drop a third wavelength channel to the DROP switch of the first ROADM, and a fourth wavelength channel to the DROP switch of the second ROADM;

(F) upon completion of step (E), determining that a center wavelength of the third and fourth wavelength channels is different from a center wavelength of every DROP wavelength channel in the third and fourth look-up tables, respectively;

(G) upon completion of step (F), controlling the input WSS of the first and second ROADM to direct the third and fourth wavelength channels to the DROP switch of the first and second ROADM, respectively; and (H) upon completion of step (F), adding the third and fourth wavelength channels to the third and fourth look-up tables, respectively.

17. The method of claim 16, further comprising
(I) coupling first and second pluralities of transmitters to the ingress ports of the ADD switches of the first and second ROADMs, respectively;
(J) building fifth and sixth look-up tables of ADD wavelength channels to be added via the ADD switches of the first and second ROADMs, respectively, wherein each ADD wavelength channel of the fifth and sixth look-up tables has a center wavelength that is different from a center wavelength of every other ADD wavelength channel in the fifth and sixth look-up tables, respectively; and
(K) upon completion of step (I), causing the first and second pluralities of transmitters to transmit the ADD wavelength channels of the fifth and sixth look-up tables, respectively.

\* \* \* \* \*